US007533906B2

(12) United States Patent
Luettgen et al.

(10) Patent No.: US 7,533,906 B2
(45) Date of Patent: May 19, 2009

(54) ROTATABLE AND PIVOTABLE CONNECTOR

(75) Inventors: Harold A. Luettgen, Windsor, CO (US); Gary Golichowski, Cheyenne, WY (US)

(73) Assignee: Water Pik, Inc., Fort Collins, CO (US)

( * ) Notice: Subject to any disclaimer, the term of this patent is extended or adjusted under 35 U.S.C. 154(b) by 58 days.

(21) Appl. No.: 10/964,800

(22) Filed: Oct. 13, 2004

(65) Prior Publication Data

US 2005/0082824 A1 Apr. 21, 2005

Related U.S. Application Data

(60) Provisional application No. 60/511,253, filed on Oct. 14, 2003.

(51) Int. Cl.
*F16L 27/04* (2006.01)

(52) U.S. Cl. .................................... 285/146.1; 285/261

(58) Field of Classification Search .............. 285/146.1, 285/146.2, 146.3, 261
See application file for complete search history.

(56) References Cited

U.S. PATENT DOCUMENTS

| | | | |
|---|---|---|---|
| 203,094 | A | 4/1878 | Wakeman |
| 204,333 | A | 5/1878 | Josias |
| 309,349 | A | 12/1884 | Hart |
| 428,023 | A | 5/1890 | Schoff |
| 432,712 | A | 7/1890 | Taylor |
| 445,250 | A | 1/1891 | Lawless |
| 486,986 | A | 11/1892 | Schinke |
| 566,384 | A | 8/1896 | Engelhart |
| 566,410 | A | 8/1896 | Schinke |
| 570,405 | A | 10/1896 | Jerguson et al. |
| 694,888 | A | 3/1902 | Pfluger |
| 800,802 | A | 10/1905 | Franquist |
| 832,523 | A | 10/1906 | Andersson |
| 835,678 | A | 11/1906 | Hammond |
| 854,094 | A | 5/1907 | Klein |
| 926,929 | A | 7/1909 | Dusseau |
| 1,001,842 | A | 8/1911 | Greenfield |
| 1,003,037 | A | 9/1911 | Crowe |

(Continued)

FOREIGN PATENT DOCUMENTS

| | | |
|---|---|---|
| AU | 687527 | 11/1996 |

(Continued)

OTHER PUBLICATIONS

Color Copy, Labeled 1A, Gemlo, available at least as early as Dec. 2, 1998.

(Continued)

*Primary Examiner*—David Bochna
(74) *Attorney, Agent, or Firm*—Dorsey & Whitney LLP

(57) ABSTRACT

A rotatable, pivotable connector having a female end, a male end, a neck joining the male and female ends, and an exterior retention element. The exterior retention element, such as, for example, a fitting, may limit expansion of the exterior of the female end. The exterior retention element may also take the form of a retainer or similar structure to retain a fitting about the exterior of the female end of the connector. Further, the connector may be hollow, thus defining a continuous passage within. Also, multiple connectors may be interconnected to form an arm.

41 Claims, 18 Drawing Sheets

U.S. PATENT DOCUMENTS

| | | | | |
|---|---|---|---|---|
| 1,018,143 A | | 2/1912 | Vissering | |
| 1,046,573 A | | 12/1912 | Ellis | |
| 1,193,302 A | | 8/1916 | Seltner | |
| 1,203,466 A | | 10/1916 | Benson | |
| 1,207,380 A | | 12/1916 | Duffy | |
| 1,217,254 A | | 2/1917 | Winslow | |
| 1,218,895 A | | 3/1917 | Porter | |
| 1,255,577 A | | 2/1918 | Berry | |
| 1,260,181 A | | 3/1918 | Garnero | |
| 1,276,117 A | | 8/1918 | Riebe | |
| 1,284,099 A | * | 11/1918 | Harris | 285/146.1 |
| 1,327,428 A | | 1/1920 | Gregory | |
| 1,451,800 A | | 4/1923 | Agner | |
| 1,459,582 A | | 6/1923 | Dubee | |
| 1,469,528 A | | 10/1923 | Owens | |
| 1,500,921 A | | 7/1924 | Bramson et al. | |
| 1,560,789 A | | 11/1925 | Johnson et al. | |
| 1,597,477 A | | 8/1926 | Panhorst | |
| 1,633,531 A | | 6/1927 | Keller | |
| 1,692,394 A | | 11/1928 | Sundh | |
| 1,695,263 A | | 12/1928 | Jacques | |
| 1,724,147 A | | 8/1929 | Russell | |
| 1,724,161 A | | 8/1929 | Wuesthoff | |
| 1,736,160 A | | 11/1929 | Jonsson | |
| 1,754,127 A | | 4/1930 | Srulowitz | |
| 1,758,115 A | | 5/1930 | Kelly | |
| 1,778,658 A | | 10/1930 | Baker | |
| 1,821,274 A | | 9/1931 | Plummer | |
| 1,849,517 A | | 3/1932 | Fraser | |
| 1,890,156 A | | 12/1932 | Konig | |
| 1,906,575 A | | 5/1933 | Goeriz | |
| 1,934,553 A | | 11/1933 | Mueller et al. | |
| 1,946,207 A | | 2/1934 | Haire | |
| 2,011,446 A | | 8/1935 | Judell | |
| 2,024,930 A | | 12/1935 | Judell | |
| 2,033,467 A | | 3/1936 | Groeniger | |
| 2,044,445 A | | 6/1936 | Price et al. | |
| 2,085,854 A | | 7/1937 | Hathaway et al. | |
| 2,096,912 A | | 10/1937 | Morris | |
| 2,117,152 A | | 5/1938 | Crosti | |
| D113,439 S | | 2/1939 | Reinecke | |
| 2,196,783 A | | 4/1940 | Shook | |
| 2,197,667 A | | 4/1940 | Shook | |
| 2,216,149 A | | 10/1940 | Weiss | |
| D126,433 S | | 4/1941 | Enthof | |
| 2,251,192 A | | 7/1941 | Krumsiek et al. | |
| 2,268,263 A | | 12/1941 | Newell et al. | |
| 2,285,831 A | | 6/1942 | Pennypacker | |
| 2,342,757 A | | 2/1944 | Roser | |
| 2,402,741 A | | 6/1946 | Draviner | |
| D147,258 S | | 8/1947 | Becker | |
| D152,584 S | | 2/1949 | Becker | |
| 2,467,954 A | | 4/1949 | Becker | |
| 2,546,348 A | | 3/1951 | Schuman | |
| 2,567,642 A | | 9/1951 | Penshaw | |
| 2,581,129 A | | 1/1952 | Muldoon | |
| D166,073 S | | 3/1952 | Dunkelberger | |
| 2,648,762 A | | 8/1953 | Dunkelberger | |
| 2,664,271 A | | 12/1953 | Arutunoff | |
| 2,671,693 A | | 3/1954 | Hyser et al. | |
| 2,676,806 A | | 4/1954 | Bachman | |
| 2,679,575 A | | 5/1954 | Haberstump | |
| 2,680,358 A | | 6/1954 | Zublin | |
| 2,721,089 A | | 10/1955 | Shames | |
| 2,726,120 A | | 12/1955 | Bletcher et al. | |
| 2,759,765 A | | 8/1956 | Pawley | |
| 2,776,168 A | | 1/1957 | Schweda | |
| 2,792,847 A | | 5/1957 | Spencer | |
| 2,825,135 A | | 3/1958 | Tilden | |
| 2,873,999 A | | 2/1959 | Webb | |
| 2,930,505 A | | 3/1960 | Meyer | |
| 2,931,672 A | | 4/1960 | Merritt et al. | |
| 2,935,265 A | | 5/1960 | Richter | |
| 2,949,242 A | | 8/1960 | Blumberg et al. | |
| 2,957,587 A | | 10/1960 | Tobin | |
| 2,966,311 A | | 12/1960 | Davis | |
| D190,295 S | | 5/1961 | Becker | |
| 2,992,437 A | | 7/1961 | Nelson et al. | |
| 3,007,648 A | | 11/1961 | Fraser | |
| D192,935 S | | 5/1962 | Becker | |
| 3,032,357 A | | 5/1962 | Shames et al. | |
| 3,034,809 A | | 5/1962 | Greenberg | |
| 3,037,799 A | | 6/1962 | Mulac | |
| 3,081,339 A | | 3/1963 | Green et al. | |
| 3,092,333 A | | 6/1963 | Gaiotto | |
| 3,098,508 A | | 7/1963 | Gerdes | |
| 3,103,723 A | | 9/1963 | Becker | |
| 3,104,815 A | | 9/1963 | Schultz | |
| 3,104,827 A | | 9/1963 | Aghnides | |
| 3,111,277 A | | 11/1963 | Grimsley | |
| 3,121,235 A | | 2/1964 | Gellmann | |
| 3,143,857 A | | 8/1964 | Eaton | |
| 3,196,463 A | | 7/1965 | Farneth | |
| 3,231,200 A | | 1/1966 | Heald | |
| 3,236,545 A | | 2/1966 | Parkes et al. | |
| 3,239,152 A | | 3/1966 | Bachli et al. | |
| 3,266,059 A | | 8/1966 | Stelle | |
| 3,273,359 A | | 9/1966 | Fregeolle | |
| 3,306,634 A | | 2/1967 | Groves et al. | |
| 3,323,148 A | | 6/1967 | Burnon | |
| 3,329,967 A | | 7/1967 | Martinez et al. | |
| 3,341,132 A | | 9/1967 | Parkison | |
| 3,342,419 A | | 9/1967 | Weese | |
| 3,344,994 A | | 10/1967 | Fife | |
| 3,363,842 A | | 1/1968 | Burns | |
| 3,383,051 A | | 5/1968 | Fiorentino | |
| 3,389,925 A | | 6/1968 | Gottschald | |
| 3,393,311 A | | 7/1968 | Dahl | |
| 3,393,312 A | | 7/1968 | Dahl | |
| 3,402,893 A | | 9/1968 | Hindman | |
| 3,404,410 A | | 10/1968 | Sumida | |
| 3,492,029 A | | 1/1970 | French et al. | |
| 3,516,611 A | | 6/1970 | Piggott | |
| 3,546,961 A | | 12/1970 | Marton | |
| 3,550,863 A | | 12/1970 | McDermott | |
| 3,552,436 A | | 1/1971 | Stewart | |
| 3,565,116 A | | 2/1971 | Gabin | |
| 3,566,917 A | | 3/1971 | White | |
| 3,580,513 A | | 5/1971 | Martin | |
| 3,584,822 A | | 6/1971 | Oram | |
| 3,596,835 A | | 8/1971 | Smith et al. | |
| 3,612,577 A | | 10/1971 | Pope | |
| 3,641,333 A | | 2/1972 | Gendron | |
| 3,647,144 A | | 3/1972 | Parkison et al. | |
| 3,663,044 A | | 5/1972 | Contreras et al. | |
| 3,669,362 A | | 6/1972 | Meyerhofer et al. | |
| 3,669,470 A | | 6/1972 | Deurloo | |
| 3,672,648 A | | 6/1972 | Price | |
| 3,682,392 A | | 8/1972 | Kint | |
| 3,685,745 A | | 8/1972 | Peschcke-koedt | |
| D224,834 S | | 9/1972 | Laudell | |
| 3,711,029 A | | 1/1973 | Bartlett | |
| 3,722,798 A | | 3/1973 | Bletcher et al. | |
| 3,722,799 A | | 3/1973 | Rauh | |
| 3,731,084 A | | 5/1973 | Trevorrow | |
| 3,754,779 A | | 8/1973 | Peress | |
| 3,762,648 A | | 10/1973 | Deines et al. | |
| 3,768,735 A | | 10/1973 | Ward | |
| 3,778,610 A | | 12/1973 | Wolf | |
| 3,786,995 A | | 1/1974 | Manoogian et al. | |
| 3,801,019 A | | 4/1974 | Trenary et al. | |
| 3,810,580 A | | 5/1974 | Rauh | |
| 3,826,454 A | | 7/1974 | Zieger | |
| 3,840,734 A | | 10/1974 | Oram | |

| | | | |
|---|---|---|---|
| 3,845,291 | A | 10/1974 | Portyrata |
| 3,860,271 | A | 1/1975 | Rodgers |
| 3,861,719 | A | 1/1975 | Hand |
| 3,865,310 | A | 2/1975 | Elkins et al. |
| 3,869,151 | A | 3/1975 | Fletcher et al. |
| 3,896,845 | A | 7/1975 | Parker |
| 3,902,671 | A | 9/1975 | Symmons |
| 3,910,277 | A | 10/1975 | Zimmer |
| D237,708 | S | 11/1975 | Grohe |
| 3,929,164 | A | 12/1975 | Richter |
| 3,931,992 | A | 1/1976 | Coel |
| 3,958,756 | A | 5/1976 | Trenary et al. |
| D240,178 | S | 6/1976 | Johansen |
| D240,322 | S | 6/1976 | Staub |
| 3,967,783 | A | 7/1976 | Halsted et al. |
| 3,971,074 | A | 7/1976 | Yxfeldt |
| 3,979,096 | A | 9/1976 | Zieger |
| 3,997,116 | A | 12/1976 | Moen |
| 3,998,390 | A | 12/1976 | Peterson et al. |
| 3,999,714 | A | 12/1976 | Lang |
| 4,005,880 | A | 2/1977 | Anderson et al. |
| 4,006,920 | A | 2/1977 | Sadler et al. |
| 4,023,782 | A | 5/1977 | Eifer |
| 4,042,984 | A | 8/1977 | Butler |
| 4,045,054 | A | 8/1977 | Arnold |
| D245,858 | S | 9/1977 | Grube |
| D245,860 | S | 9/1977 | Grube |
| 4,068,801 | A | 1/1978 | Leutheuser |
| 4,081,135 | A | 3/1978 | Tomaro |
| 4,084,271 | A | 4/1978 | Ginsberg |
| 4,091,998 | A | 5/1978 | Peterson |
| D249,356 | S | 9/1978 | Nagy |
| 4,117,979 | A | 10/1978 | Lagarelli et al. |
| 4,129,257 | A | 12/1978 | Eggert |
| 4,130,120 | A | 12/1978 | Kohler, Jr. |
| 4,131,233 | A | 12/1978 | Koenig |
| 4,133,486 | A | 1/1979 | Fanella |
| 4,135,549 | A | 1/1979 | Baker |
| D251,045 | S | 2/1979 | Grube |
| 4,141,502 | A | 2/1979 | Grohe |
| 4,151,955 | A | 5/1979 | Stouffer |
| 4,151,957 | A | 5/1979 | Gecewicz et al. |
| 4,162,801 | A | 7/1979 | Kresky et al. |
| 4,165,837 | A | 8/1979 | Rundzaitis |
| 4,167,196 | A | 9/1979 | Morris |
| 4,174,822 | A | 11/1979 | Larsson |
| 4,185,781 | A | 1/1980 | O'Brien |
| 4,190,207 | A | 2/1980 | Fienhold et al. |
| 4,191,332 | A | 3/1980 | De Langis et al. |
| 4,203,550 | A | 5/1980 | On |
| 4,209,132 | A | 6/1980 | Kwan |
| D255,626 | S | 7/1980 | Grube |
| 4,219,160 | A | 8/1980 | Allred, Jr. |
| 4,221,338 | A | 9/1980 | Shames et al. |
| 4,243,253 | A | 1/1981 | Rogers, Jr. |
| 4,244,526 | A | 1/1981 | Arth |
| D258,677 | S | 3/1981 | Larsson |
| 4,254,914 | A | 3/1981 | Shames et al. |
| 4,258,414 | A | 3/1981 | Sokol |
| 4,272,022 | A | 6/1981 | Evans |
| 4,274,400 | A | 6/1981 | Baus |
| 4,282,612 | A | 8/1981 | King |
| D261,300 | S | 10/1981 | Klose |
| D261,417 | S | 10/1981 | Klose |
| D262,353 | S | 12/1981 | Kitson |
| 4,303,201 | A | 12/1981 | Elkins et al. |
| 4,319,608 | A | 3/1982 | Raikov et al. |
| 4,330,089 | A | 5/1982 | Finkbeiner |
| D266,212 | S | 9/1982 | Haug et al. |
| 4,350,298 | A | 9/1982 | Tada |
| 4,353,508 | A | 10/1982 | Butterfield et al. |
| 4,358,056 | A | 11/1982 | Greenhut et al. |
| D267,582 | S | 1/1983 | Mackay et al. |
| D268,359 | S | 3/1983 | Klose |
| D268,442 | S | 3/1983 | Darmon |
| D268,611 | S | 4/1983 | Klose |
| 4,383,554 | A | 5/1983 | Merriman |
| 4,396,797 | A | 8/1983 | Sakuragi et al. |
| 4,398,669 | A | 8/1983 | Fienhold |
| 4,425,965 | A | 1/1984 | Bayh, III et al. |
| 4,432,392 | A | 2/1984 | Paley |
| D274,457 | S | 6/1984 | Haug |
| 4,461,052 | A | 7/1984 | Mostul |
| 4,465,308 | A | 8/1984 | Martini |
| 4,467,964 | A | 8/1984 | Kaeser |
| 4,479,610 | A | 10/1984 | Etheridge et al. |
| 4,495,550 | A | 1/1985 | Visciano |
| 4,527,745 | A | 7/1985 | Butterfield et al. |
| 4,540,202 | A | 9/1985 | Amphoux et al. |
| 4,545,081 | A | 10/1985 | Nestor et al. |
| 4,553,775 | A | 11/1985 | Halling |
| D281,820 | S | 12/1985 | Oba et al. |
| 4,561,593 | A | 12/1985 | Cammack et al. |
| 4,564,889 | A | 1/1986 | Bolson |
| 4,568,216 | A | 2/1986 | Mizusawa et al. |
| 4,571,003 | A | 2/1986 | Roling et al. |
| 4,572,232 | A | 2/1986 | Gruber |
| D283,645 | S | 4/1986 | Tanaka |
| 4,587,991 | A | 5/1986 | Chorkey |
| 4,588,130 | A | 5/1986 | Trenary et al. |
| 4,598,866 | A | 7/1986 | Cammack et al. |
| 4,614,303 | A | 9/1986 | Moseley, Jr. et al. |
| 4,616,298 | A | 10/1986 | Bolson |
| 4,618,100 | A | 10/1986 | White et al. |
| 4,629,124 | A | 12/1986 | Gruber |
| 4,629,125 | A | 12/1986 | Liu |
| 4,643,463 | A | 2/1987 | Halling et al. |
| 4,645,244 | A | 2/1987 | Curtis |
| 4,650,120 | A | 3/1987 | Kress |
| 4,650,470 | A | 3/1987 | Epstein |
| 4,652,025 | A | 3/1987 | Conroy, Sr. |
| 4,654,900 | A | 4/1987 | McGhee |
| 4,657,185 | A | 4/1987 | Rundzaitis |
| 4,669,666 | A | 6/1987 | Finkbeiner |
| 4,669,757 | A | 6/1987 | Bartholomew |
| 4,674,687 | A | 6/1987 | Smith et al. |
| 4,683,917 | A | 8/1987 | Bartholomew |
| 4,703,893 | A | 11/1987 | Gruber |
| 4,707,770 | A | 11/1987 | Van Duyn |
| 4,719,654 | A | 1/1988 | Blessing |
| 4,722,029 | A | 1/1988 | Ahle et al. |
| 4,733,337 | A | 3/1988 | Bieberstein |
| D295,437 | S | 4/1988 | Fabian |
| 4,739,801 | A | 4/1988 | Kimura et al. |
| 4,749,126 | A | 6/1988 | Kessener et al. |
| 4,752,975 | A | 6/1988 | Tiernan |
| D296,582 | S | 7/1988 | Haug et al. |
| 4,754,928 | A | 7/1988 | Rogers et al. |
| D297,160 | S | 8/1988 | Robbins |
| 4,778,104 | A | 10/1988 | Fisher |
| 4,787,591 | A | 11/1988 | Villacorta |
| 4,790,294 | A | 12/1988 | Allred, III et al. |
| 4,801,091 | A | 1/1989 | Sandvik |
| 4,809,369 | A | 3/1989 | Bowden |
| 4,839,599 | A | 6/1989 | Fischer |
| 4,842,059 | A | 6/1989 | Tomek |
| D302,325 | S | 7/1989 | Charet et al. |
| 4,850,616 | A | 7/1989 | Pava |
| 4,854,499 | A | 8/1989 | Neuman |
| 4,856,822 | A * | 8/1989 | Parker ........................ 285/62 |
| 4,863,328 | A | 9/1989 | Malek |
| 4,865,362 | A | 9/1989 | Holden |
| 4,871,196 | A | 10/1989 | Kingsford |
| 4,896,658 | A | 1/1990 | Yonekubo et al. |
| D306,351 | S | 2/1990 | Charet et al. |
| 4,901,765 | A | 2/1990 | Poe |

| | | | |
|---|---|---|---|
| 4,901,927 | A | 2/1990 | Valdivia |
| 4,903,178 | A | 2/1990 | Englot et al. |
| 4,903,897 | A | 2/1990 | Hayes |
| 4,903,922 | A | 2/1990 | Harris, III |
| 4,907,137 | A | 3/1990 | Schladitz et al. |
| 4,907,744 | A | 3/1990 | Jousson |
| 4,909,435 | A | 3/1990 | Kidouchi et al. |
| 4,914,759 | A | 4/1990 | Goff |
| 4,946,202 | A | 8/1990 | Perricone |
| 4,951,329 | A | 8/1990 | Shaw |
| 4,953,585 | A | 9/1990 | Rollini et al. |
| 4,959,758 | A | 9/1990 | Filosa et al. |
| 4,964,573 | A | 10/1990 | Lipski |
| 4,972,048 | A | 11/1990 | Martin |
| D313,267 | S | 12/1990 | Lenci et al. |
| 4,975,123 | A | 12/1990 | Gray |
| 4,976,460 | A | 12/1990 | Newcombe et al. |
| D314,246 | S | 1/1991 | Bache |
| D315,191 | S | 3/1991 | Mikol |
| 4,998,673 | A | 3/1991 | Pilolla |
| 5,004,158 | A | 4/1991 | Halem et al. |
| D317,348 | S | 6/1991 | Geneve et al. |
| 5,020,570 | A | 6/1991 | Cotter |
| 5,022,103 | A | 6/1991 | Faist |
| 5,032,015 | A | 7/1991 | Christianson |
| 5,033,528 | A | 7/1991 | Volcani |
| 5,033,897 | A | 7/1991 | Chen |
| D319,294 | S | 8/1991 | Kohler, Jr. et al. |
| D320,064 | S | 9/1991 | Presman |
| 5,046,764 | A | 9/1991 | Kimura et al. |
| D321,062 | S | 10/1991 | Bonbright |
| 5,058,804 | A | 10/1991 | Yonekubo et al. |
| D322,119 | S | 12/1991 | Haug et al. |
| D322,681 | S | 12/1991 | Yuen |
| 5,070,552 | A | 12/1991 | Gentry et al. |
| 5,071,070 | A | 12/1991 | Hardy |
| D323,545 | S | 1/1992 | Ward |
| 5,082,019 | A | 1/1992 | Tetrault |
| 5,086,878 | A | 2/1992 | Swift |
| 5,090,624 | A | 2/1992 | Rogers |
| 5,100,055 | A | 3/1992 | Rokitenetz et al. |
| D325,769 | S | 4/1992 | Haug et al. |
| D325,770 | S | 4/1992 | Haug et al. |
| 5,103,384 | A | 4/1992 | Drohan |
| 5,107,406 | A | 4/1992 | Sekido et al. |
| D326,311 | S | 5/1992 | Lenci et al. |
| 5,121,511 | A | 6/1992 | Sakamoto et al. |
| D327,729 | S | 7/1992 | Rogers |
| 5,127,580 | A | 7/1992 | Fu-I |
| 5,134,251 | A | 7/1992 | Martin |
| D328,944 | S | 8/1992 | Robbins |
| 5,135,173 | A | 8/1992 | Cho |
| 5,141,016 | A | 8/1992 | Nowicki |
| D329,504 | S | 9/1992 | Yuen |
| 5,143,123 | A | 9/1992 | Richards et al. |
| 5,143,300 | A | 9/1992 | Cutler |
| 5,145,114 | A | 9/1992 | Monch |
| D330,068 | S | 10/1992 | Haug et al. |
| D330,408 | S | 10/1992 | Thacker |
| D330,409 | S | 10/1992 | Raffo |
| 5,153,976 | A | 10/1992 | Benchaar et al. |
| 5,154,355 | A | 10/1992 | Gonzalez |
| 5,154,483 | A | 10/1992 | Zeller |
| 5,161,567 | A | 11/1992 | Humpert |
| 5,163,752 | A | 11/1992 | Copeland et al. |
| 5,171,429 | A | 12/1992 | Yasuo |
| 5,172,860 | A | 12/1992 | Yuch |
| 5,172,862 | A | 12/1992 | Heimann et al. |
| 5,172,866 | A | 12/1992 | Ward |
| D332,303 | S | 1/1993 | Klose |
| D332,994 | S | 2/1993 | Huen |
| D333,339 | S | 2/1993 | Klose |
| 5,197,767 | A | 3/1993 | Kimura et al. |
| D334,794 | S | 4/1993 | Klose |
| D335,171 | S | 4/1993 | Lenci et al. |
| 5,201,468 | A | 4/1993 | Freier et al. |
| 5,206,963 | A | 5/1993 | Wiens |
| 5,207,499 | A | 5/1993 | Vajda et al. |
| 5,213,267 | A | 5/1993 | Heimann et al. |
| 5,215,338 | A | 6/1993 | Kimura et al. |
| 5,220,697 | A | 6/1993 | Birchfield |
| D337,839 | S | 7/1993 | Zeller |
| 5,228,625 | A | 7/1993 | Grassberger |
| 5,230,106 | A | 7/1993 | Henkin et al. |
| D338,542 | S | 8/1993 | Yuen |
| 5,232,162 | A | 8/1993 | Chih |
| D339,492 | S | 9/1993 | Klose |
| D339,627 | S | 9/1993 | Klose |
| D339,848 | S | 9/1993 | Gottwald |
| 5,246,169 | A | 9/1993 | Heimann et al. |
| D340,376 | S | 10/1993 | Klose |
| 5,253,670 | A | 10/1993 | Perrott |
| 5,253,807 | A | 10/1993 | Newbegin |
| 5,254,809 | A | 10/1993 | Martin |
| D341,007 | S | 11/1993 | Haug et al. |
| D341,191 | S | 11/1993 | Klose |
| D341,220 | S | 11/1993 | Eagan |
| 5,263,646 | A | 11/1993 | McCauley |
| 5,265,833 | A | 11/1993 | Heimann et al. |
| 5,268,826 | A | 12/1993 | Greene |
| 5,276,596 | A | 1/1994 | Krenzel |
| 5,277,391 | A | 1/1994 | Haug et al. |
| 5,286,071 | A | 2/1994 | Storage |
| 5,288,110 | A | 2/1994 | Allread |
| 5,294,054 | A | 3/1994 | Benedict et al. |
| 5,297,735 | A | 3/1994 | Heimann et al. |
| D345,811 | S | 4/1994 | Van Deursen et al. |
| D346,426 | S | 4/1994 | Warshawsky |
| D346,428 | S | 4/1994 | Warshawsky |
| D346,430 | S | 4/1994 | Warshawsky |
| D347,262 | S | 5/1994 | Black et al. |
| D347,265 | S | 5/1994 | Gottwald |
| 5,316,216 | A | 5/1994 | Cammack et al. |
| D348,720 | S | 7/1994 | Haug et al. |
| 5,329,650 | A | 7/1994 | Zaccai et al. |
| D349,947 | S | 8/1994 | Hing-Wah |
| 5,333,787 | A | 8/1994 | Smith et al. |
| 5,333,789 | A | 8/1994 | Garneys |
| 5,340,064 | A | 8/1994 | Heimann et al. |
| 5,340,165 | A | 8/1994 | Sheppard |
| D350,808 | S | 9/1994 | Warshawsky |
| 5,344,080 | A | 9/1994 | Matsui |
| 5,349,987 | A | 9/1994 | Shieh |
| 5,356,076 | A | 10/1994 | Bishop |
| 5,356,077 | A | 10/1994 | Shames |
| D352,347 | S | 11/1994 | Dannenberg |
| D352,766 | S | 11/1994 | Hill et al. |
| 5,368,235 | A | 11/1994 | Drozdoff et al. |
| 5,369,556 | A | 11/1994 | Zeller |
| 5,370,427 | A | 12/1994 | Hoelle et al. |
| 5,385,500 | A | 1/1995 | Schmidt |
| D355,242 | S | 2/1995 | Warshawsky |
| D355,703 | S | 2/1995 | Duell |
| D356,626 | S | 3/1995 | Wang |
| 5,397,064 | A | 3/1995 | Heitzman |
| 5,398,872 | A | 3/1995 | Joubran |
| 5,398,977 | A | 3/1995 | Berger et al. |
| 5,402,812 | A | 4/1995 | Moineau et al. |
| 5,405,089 | A | 4/1995 | Heimann et al. |
| 5,414,879 | A | 5/1995 | Hiraishi et al. |
| 5,423,348 | A | 6/1995 | Jezek et al. |
| 5,433,384 | A | 7/1995 | Chan et al. |
| D361,399 | S | 8/1995 | Carbone et al. |
| D361,623 | S | 8/1995 | Huen |
| 5,441,075 | A | 8/1995 | Clare |
| 5,449,206 | A | 9/1995 | Lockwood |

D363,360 S 10/1995 Santarsiero
5,454,809 A 10/1995 Janssen
5,468,057 A 11/1995 Megerle et al.
D364,935 S 12/1995 deBlois
D365,625 S 12/1995 Bova
D365,646 S 12/1995 deBlois
5,476,225 A 12/1995 Chan
D366,309 S 1/1996 Huang
D366,707 S 1/1996 Kaiser
D366,708 S 1/1996 Santarsiero
D366,709 S 1/1996 Szmanski
D366,710 S 1/1996 Szymanski
5,481,765 A 1/1996 Wang
D366,948 S 2/1996 Carbone
D367,315 S 2/1996 Andrus
D367,333 S 2/1996 Swyst
D367,696 S 3/1996 Andrus
D367,934 S 3/1996 Carbone
D368,146 S 3/1996 Carbone
D368,317 S 3/1996 Swyst
5,499,767 A 3/1996 Morand
D368,539 S 4/1996 Carbone et al.
D368,540 S 4/1996 Santarsiero
D368,541 S 4/1996 Kaiser et al.
D368,542 S 4/1996 deBlois et al.
D369,204 S 4/1996 Andrus
D369,205 S 4/1996 Andrus
5,507,436 A 4/1996 Ruttenberg
D369,873 S 5/1996 deBlois et al.
D369,874 S 5/1996 Santarsiero
D369,875 S 5/1996 Carbone
D370,052 S 5/1996 Chan et al.
D370,250 S 5/1996 Fawcett et al.
D370,277 S 5/1996 Kaiser
D370,278 S 5/1996 Nolan
D370,279 S 5/1996 deBlois
D370,280 S 5/1996 Kaiser
D370,281 S 5/1996 Johnstone et al.
5,517,392 A 5/1996 Rousso et al.
5,521,803 A 5/1996 Eckert et al.
D370,542 S 6/1996 Santarsiero
D370,735 S 6/1996 deBlois
D370,987 S 6/1996 Santarsiero
D370,988 S 6/1996 Santarsiero
D371,448 S 7/1996 Santarsiero
D371,618 S 7/1996 Nolan
D371,619 S 7/1996 Szymanski
D371,856 S 7/1996 Carbone
D372,318 S 7/1996 Szymanski
D372,319 S 7/1996 Carbone
5,531,625 A 7/1996 Zhong
5,539,624 A 7/1996 Dougherty
D372,548 S 8/1996 Carbone
D372,998 S 8/1996 Carbone
D373,210 S 8/1996 Santarsiero
D373,434 S 9/1996 Nolan
D373,435 S 9/1996 Nolan
D373,645 S 9/1996 Johnstone et al.
D373,646 S 9/1996 Szymanski et al.
D373,647 S 9/1996 Kaiser
D373,648 S 9/1996 Kaiser
D373,649 S 9/1996 Carbone
D373,651 S 9/1996 Szymanski
D373,652 S 9/1996 Kaiser
5,551,637 A 9/1996 Lo
5,552,973 A 9/1996 Hsu
5,558,278 A 9/1996 Gallorini
D374,271 S 10/1996 Fleischmann
D374,297 S 10/1996 Kaiser
D374,298 S 10/1996 Swyst
D374,299 S 10/1996 Carbone
D374,493 S 10/1996 Szymanski
D374,494 S 10/1996 Santarsiero
D374,732 S 10/1996 Kaiser
D374,733 S 10/1996 Santasiero
5,560,548 A 10/1996 Mueller et al.
5,567,115 A 10/1996 Carbone
D375,541 S 11/1996 Michaluk
5,577,664 A 11/1996 Heitzman
D376,217 S 12/1996 Kaiser
D376,860 S 12/1996 Santarsiero
D376,861 S 12/1996 Johnstone et al.
D376,862 S 12/1996 Carbone
5,605,173 A 2/1997 Arnaud
D378,401 S 3/1997 Neufeld et al.
5,613,638 A 3/1997 Blessing
5,613,639 A 3/1997 Storm et al.
5,615,837 A 4/1997 Roman
5,624,074 A 4/1997 Parisi
5,624,498 A 4/1997 Lee et al.
D379,212 S 5/1997 Chan
D379,404 S 5/1997 Spelts
5,632,049 A 5/1997 Chen
D381,405 S 7/1997 Waidele et al.
D381,737 S 7/1997 Chan
D382,936 S 8/1997 Shfaram
5,653,260 A 8/1997 Huber
5,667,146 A 9/1997 Pimentel et al.
D385,332 S 10/1997 Andrus
D385,333 S 10/1997 Caroen et al.
D385,334 S 10/1997 Caroen et al.
D385,616 S 10/1997 Dow et al.
D385,947 S 11/1997 Dow et al.
D387,230 S 12/1997 von Buelow et al.
5,692,252 A 12/1997 Zwezdaryk
5,699,964 A 12/1997 Bergmann et al.
5,702,057 A 12/1997 Huber
D389,558 S 1/1998 Andrus
5,704,080 A 1/1998 Kuhne
5,718,380 A 2/1998 Schorn et al.
D392,369 S 3/1998 Chan
5,730,361 A 3/1998 Thonnes
5,730,362 A 3/1998 Cordes
5,730,363 A 3/1998 Kress
5,742,961 A 4/1998 Casperson et al.
D394,490 S 5/1998 Andrus et al.
5,746,375 A 5/1998 Guo
5,749,552 A 5/1998 Fan
5,749,602 A 5/1998 Delaney et al.
D394,899 S 6/1998 Caroen et al.
D395,074 S 6/1998 Neibrook et al.
D395,075 S 6/1998 Kolada
D395,142 S 6/1998 Neilhook
5,765,760 A 6/1998 Kuo
5,769,802 A 6/1998 Wang
5,772,120 A 6/1998 Huber
5,778,939 A 7/1998 Hok-Yin
5,788,157 A 8/1998 Kress
D398,370 S 9/1998 Purdy
5,806,771 A 9/1998 Loschelder et al.
5,819,791 A 10/1998 Chronister et al.
5,820,574 A 10/1998 Henkin et al.
5,823,431 A 10/1998 Pierce
5,823,442 A 10/1998 Guo
D401,680 S 11/1998 Tiernan
5,839,666 A 11/1998 Heimann et al.
D402,350 S 12/1998 Andrus et al.
D404,116 S 1/1999 Bosio
5,855,348 A 1/1999 Fornara
5,860,599 A 1/1999 Lin
5,862,543 A 1/1999 Reynoso et al.
5,862,985 A 1/1999 Neibrook et al.
D405,502 S 2/1999 Tse
5,865,375 A 2/1999 Hsu
5,865,378 A 2/1999 Hollinshead et al.
5,873,647 A 2/1999 Kurtz et al.

D406,636 S 3/1999 Male et al.
D408,893 S 4/1999 Tse
D409,276 S 5/1999 Ratzlaff
D410,276 S 5/1999 Ben-Tsur
5,918,809 A 7/1999 Simmons
5,918,811 A 7/1999 Denham et al.
D413,157 S 8/1999 Ratzlaff
5,937,905 A 8/1999 Santos
5,947,388 A 9/1999 Woodruff
D415,247 S 10/1999 Haverstraw et al.
5,961,046 A 10/1999 Joubran
5,979,776 A 11/1999 Williams
5,992,762 A 11/1999 Wang
D418,200 S 12/1999 Ben-Tsur
5,997,047 A 12/1999 Pimentel et al.
6,003,165 A 12/1999 Loyd
D418,902 S 1/2000 Haverstraw et al.
D418,903 S 1/2000 Haverstraw et al.
D418,904 S 1/2000 Milrud
D421,099 S 2/2000 Mullenmeister
6,021,960 A 2/2000 Kehat
D422,053 S 3/2000 Brenner et al.
6,042,027 A 3/2000 Sandvik
6,042,155 A 3/2000 Lockwood
D422,336 S 4/2000 Haverstraw et al.
D422,337 S 4/2000 Chan
D423,083 S 4/2000 Haug et al.
D423,110 S 4/2000 Cipkowski
D424,160 S 5/2000 Haug et al.
D424,161 S 5/2000 Haug et al.
D424,162 S 5/2000 Haug et al.
D424,163 S 5/2000 Haug et al.
D427,661 S 7/2000 Haverstraw et al.
D428,110 S 7/2000 Haug et al.
D428,125 S 7/2000 Chan
6,085,780 A 7/2000 Morris
6,095,801 A * 8/2000 Spiewak .................. 285/146.1
D430,643 S 9/2000 Tse
6,123,272 A 9/2000 Havican et al.
6,123,308 A 9/2000 Faisst
D432,624 S 10/2000 Chan
D432,625 S 10/2000 Chan
D433,096 S 10/2000 Tse
D433,097 S 10/2000 Tse
6,126,091 A 10/2000 Heitzman
6,126,290 A 10/2000 Veigel
D434,109 S 11/2000 Ko
6,164,569 A 12/2000 Hollinshead et al.
6,164,570 A 12/2000 Smeltzer
D435,889 S 1/2001 Ben-Tsur et al.
6,199,580 B1 3/2001 Morris
6,199,729 B1 3/2001 Drzymkowski
6,202,679 B1 3/2001 Titus
D440,641 S 4/2001 Hollinshead et al.
D441,059 S 4/2001 Fleischmann
D443,025 S 5/2001 Kollmann et al.
D443,027 S 5/2001 Kollmann et al.
D443,029 S 5/2001 Kollmann et al.
6,227,456 B1 5/2001 Colman
6,230,984 B1 5/2001 Jager
6,230,988 B1 5/2001 Chao et al.
6,230,989 B1 5/2001 Haverstraw et al.
6,250,572 B1 6/2001 Chen
6,254,014 B1 7/2001 Clearman et al.
6,270,278 B1 8/2001 Mauro
6,276,004 B1 8/2001 Bertrand et al.
6,283,447 B1 9/2001 Fleet
6,286,764 B1 9/2001 Garvey et al.
D450,370 S 11/2001 Wales et al.
D450,805 S 11/2001 Lindholm et al.
D450,806 S 11/2001 Lindholm et al.
D450,807 S 11/2001 Lindholm et al.
D451,169 S 11/2001 Lindholm et al.
D451,170 S 11/2001 Lindholm et al.
D451,171 S 11/2001 Lindholm et al.
D451,172 S 11/2001 Lindholm et al.
6,321,777 B1 11/2001 Wu
D451,583 S 12/2001 Lindholm et al.
D451,980 S 12/2001 Lindholm et al.
D452,553 S 12/2001 Lindholm et al.
D452,725 S 1/2002 Lindholm et al.
D452,897 S 1/2002 Gillette et al.
D453,370 S 2/2002 Lindholm et al.
D453,551 S 2/2002 Lindholm et al.
6,349,735 B2 2/2002 Gul
6,375,342 B1 4/2002 Koren et al.
D457,937 S 5/2002 Lindholm et al.
D458,348 S 6/2002 Mullenmeister
D461,224 S 8/2002 Lobermeier
D461,878 S 8/2002 Green et al.
6,450,425 B1 9/2002 Chen
6,454,186 B2 9/2002 Haverstraw et al.
6,464,265 B1 10/2002 Mikol
D465,552 S 11/2002 Tse
D465,553 S 11/2002 Singtoroj
6,484,952 B2 11/2002 Koren
D468,800 S 1/2003 Tse
D469,165 S 1/2003 Lim
6,502,796 B1 1/2003 Wales
D470,219 S 2/2003 Schweitzer
6,515,070 B2 2/2003 Kobylanska et al.
D471,253 S 3/2003 Tse
D471,953 S 3/2003 Colligan et al.
6,533,194 B2 3/2003 Marsh et al.
6,550,697 B2 4/2003 Lai
6,607,148 B1 8/2003 Marsh et al.
6,611,971 B1 9/2003 Antoniello et al.
6,626,210 B2 9/2003 Luettgen et al.
6,629,651 B1 10/2003 Male et al.
6,637,676 B2 10/2003 Zieger et al.
6,641,057 B2 11/2003 Thomas et al.
6,643,862 B2 11/2003 Aitken
6,659,117 B2 12/2003 Gilmore
D485,887 S 1/2004 Luettgen et al.
6,691,338 B2 2/2004 Zieger
D487,498 S 3/2004 Blomstrom
6,701,953 B2 3/2004 Agosta
D490,498 S 5/2004 Golichowski
6,739,523 B2 5/2004 Haverstraw et al.
D492,004 S 6/2004 Haug et al.
D492,007 S 6/2004 Kollmann et al.
6,742,725 B1 6/2004 Fan
D493,208 S 7/2004 Lin
D494,661 S 8/2004 Zieger et al.
D496,446 S 9/2004 Zwezdaryk
D496,987 S 10/2004 Glunk
D497,974 S 11/2004 Haug et al.
D498,514 S 11/2004 Haug et al.
D500,121 S 12/2004 Blomstrom
D500,547 S 1/2005 Gray
D500,549 S 1/2005 Blomstrom
D501,242 S 1/2005 Blomstrom
D502,760 S 3/2005 Zieger et al.
D502,761 S 3/2005 Zieger et al.
D503,774 S 4/2005 Zieger
D503,775 S 4/2005 Zieger
D503,966 S 4/2005 Zieger
6,926,212 B1 8/2005 Glass
6,981,661 B1 1/2006 Chen
D517,669 S 3/2006 Zieger et al.
7,066,411 B2 6/2006 Male et al.
7,070,125 B2 7/2006 Williams et al.
D527,440 S 8/2006 Macan
D528,631 S 9/2006 Gillette et al.
D529,151 S 9/2006 Macan et al.
7,100,845 B1 9/2006 Hsieh

| | | | |
|---|---|---|---|
| D533,253 S | 12/2006 | Luettgen et al. | |
| 7,147,172 B2 | 12/2006 | Darling, III et al. | |
| 7,156,325 B1 | 1/2007 | Chen | |
| 7,201,331 B2 | 4/2007 | Bertrand | |
| 2002/0033424 A1 | 3/2002 | Rivera et al. | |
| 2002/0070292 A1 | 6/2002 | Hazenfield | |
| 2004/0074993 A1 | 4/2004 | Thomas et al. | |
| 2004/0195381 A1 | 10/2004 | Luettgen et al. | |
| 2005/0061896 A1 | 3/2005 | Luettgen et al. | |
| 2005/0283904 A1 | 12/2005 | Macan et al. | |
| 2006/0016913 A1 | 1/2006 | Williams et al. | |
| 2006/0043214 A1 | 3/2006 | Macan et al. | |
| 2006/0231648 A1 | 10/2006 | Male et al. | |
| 2007/0119980 A1 | 5/2007 | Somerfield et al. | |
| 2007/0246577 A1 | 10/2007 | Leber | |
| 2007/0272770 A1 | 11/2007 | Leber et al. | |
| 2008/0083844 A1 | 4/2008 | Leber et al. | |

FOREIGN PATENT DOCUMENTS

| | | | |
|---|---|---|---|
| CA | 659510 | 3/1963 | |
| CA | 2150317 | 11/1995 | |
| CH | 234284 | 3/1963 | |
| DE | 352813 | 5/1922 | |
| DE | 848627 | 9/1952 | |
| DE | 854100 | 10/1952 | |
| DE | 2360534 | 6/1974 | |
| DE | 2806093 | 8/1979 | |
| DE | 3107808 | 9/1982 | |
| DE | 3246327 | 6/1984 | |
| DE | 3440901 | 7/1985 | |
| DE | 3706320 | 3/1988 | |
| DE | 8804236 | 6/1988 | |
| DE | 4034695 | 5/1991 | |
| DE | 4142198 | 4/1993 | |
| DE | 19608085 | 9/1996 | |
| EP | 0167063 | 6/1985 | |
| EP | 0478999 | 4/1992 | |
| EP | 0514753 | 11/1992 | |
| EP | 0617644 | 10/1994 | |
| EP | 0683354 | 11/1995 | |
| EP | 0687851 | 12/1995 | |
| EP | 0695907 | 2/1996 | |
| EP | 0719588 | 7/1996 | |
| EP | 0721082 | 7/1996 | |
| EP | 0733747 | 9/1996 | |
| EP | 0808661 | 11/1997 | |
| EP | 0726811 | 1/1998 | |
| FR | 538538 | 6/1922 | |
| FR | 873808 | 7/1942 | |
| FR | 1039750 | 10/1953 | |
| FR | 1098836 | 8/1955 | |
| FR | 2596492 | * 10/1987 | ............. 285/146.1 |
| FR | 2695452 | 3/1994 | |
| GB | 3314 | 0/1914 | |
| GB | 10086 | 0/1894 | |
| GB | 129812 | 7/1919 | |
| GB | 204600 | 10/1923 | |
| GB | 634483 | 3/1950 | |
| GB | 971866 | 10/1964 | |
| GB | 1111126 | 4/1968 | |
| GB | 2066074 | 1/1980 | |
| GB | 2066704 | 7/1981 | |
| GB | 2068778 | 8/1981 | |
| GB | 2121319 | 12/1983 | |
| GB | 2155984 | 10/1985 | |
| GB | 2156932 A | 10/1985 | |
| GB | 2199771 | 7/1988 | |
| GB | 2298595 | 11/1996 | |
| IT | 327400 | 7/1935 | |
| IT | 350359 | 7/1937 | |
| IT | 563459 | 5/1957 | |
| JP | S63-181459 | 11/1988 | |
| JP | H2-78660 | 6/1990 | |
| JP | 4062238 | 2/1992 | |
| JP | 4146708 | 5/1992 | |
| NE | 8902957 | 6/1991 | |
| WO | WO93/12894 | 7/1993 | |
| WO | WO93/25839 | 12/1993 | |
| WO | WO96/23999 | 8/1996 | |
| WO | WO98/30336 | 7/1998 | |

OTHER PUBLICATIONS

Color Copy, Labeled 1B, Gemlo, available at least as early as Dec. 2, 1998.

"Showermaster 2" advertisement, Showermaster, P.O. Box 5311, Coeur d'Alene, ID 83814, as early as Jan. 1997.

Non-Final Office Action, U.S. Appl. No. 10/021,852, 6 pages, Jul. 17, 2002.

Amendment and Response to Non-Final Office Action, U.S. Appl. No. 10/021,852, 10 pages, Oct. 17, 2002.

Final Office Action, U.S. Appl. No. 10/021,852, 10 pages, Nov. 7, 2002.

Amendment and Response to Non-Final Office Action, U.S. Appl. No. 10/021,852, 6 pages, Feb. 6, 2003.

Non-Final Office Action, U.S. Appl. No. 10/021,852, 11 pages, Apr. 1, 2003.

Notice of Allowance, U.S. Appl. No. 10/021,852, 9 pages, May 7, 2003.

Non-Final Office Action, U.S. Appl. No. 11/426,531, 15 pages, Sep. 26, 2006.

Amendment and Response to Non-Final Office Action, U.S. Appl. No. 11/426,531, 12 pages, Jan. 26, 2007.

Final Office Action, U.S. Appl. No. 11/426,531, 5 pages, Feb. 16, 2007.

Non-Final Office Action, U.S. Appl. No. 10/658,032, 15 pages, Aug. 11, 2004.

Amendment and Response to Non-Final Office Action, U.S. Appl. No. 10/658,032, 14 pages, Jan. 11, 2005.

Non-Final Office Action, U.S. Appl. No. 10/658,032, 8 pages, Apr. 20, 2005.

Amendment and Response to Non-Final Office Action, U.S. Appl. No. 10/658,032, 13 pages, Jul. 5, 2005.

Notice of Allowance, U.S. Appl. No. 10/658,032, 6 pages, Aug. 12, 2005.

Notice of Allowance, U.S. Appl. No. 10/658,032, 7 pages, Mar. 10, 2006.

Supplemental Notice of Allowability, U.S. Appl. No. 10/658,032, 3 pages, Apr. 10, 2006.

Non-Final Office Action, U.S. Appl. No. 10/044,508, 6 pages, Jun. 19, 2002.

Amendment and Response to Non-Final Office Action, U.S. Appl. No. 10/044,508, 8 pages, Oct. 21, 2002.

Notice of Allowance, U.S. Appl. No. 10/044,508, 5 pages, Nov. 11, 2002.

Notice of Allowance, U.S. Appl. No. 10/044,508, 10 pages, Apr. 8, 2003.

Non-Final Office Action, U.S. Appl. No. 09/615,299, 12 pages, Jan. 3, 2001.

Amendment and Response to Non-Final Office Action, U.S. Appl. No. 09/615,299, 8 pages, May 3, 2001.

Final Office Action, U.S. Appl. No. 09/615,299, 5 pages, Jul. 31, 2001.

Amendment and Response to Final Office Action, U.S. Appl. No. 09/615,299, 4 pages, Oct. 1, 2001.

Advisory Action, U.S. Appl. No. 09/615,299, 3 pages, Oct. 18, 2001.

Supplemental Amendment and Response to Final Office Action, U.S. Appl. No. 09/615,299, 6 pages, Oct. 31, 2001.

Interview Summary, U.S. Appl. No. 09/615,299, 2 pages, Jan. 31, 2002.

Preliminary Amendment, U.S. Appl. No. 09/615,299, 8 pages, Feb. 21, 2002.

Preliminary Amendment, U.S. Appl. No. 09/615,299, 6 pages, Apr. 12, 2002.

Non-Final Office Action, U.S. Appl. No. 09/615,299, 7 pages, Jun. 4, 2002.
Amendment and Response to Final Office Action, U.S. Appl. No. 09/615,299, 12 pages, Aug. 5, 2002.
Notice of Allowance, U.S. Appl. No. 09/615,299, 10 pages, Dec. 30, 2002.
Notice of Allowance, U.S. Appl. No. 09/615,299, 6 pages, May 6, 2003.
Non-Final Office Action, U.S. Appl. No. 09/241,345, 8 pages, Jul. 13, 1999.
Amendment and Response to Final Office Action, U.S. Appl. No. 09/241,345, 8 pages, Jan. 13, 2000.
Notice of Allowance, U.S. Appl. No. 09/241,345, 3 pages, Mar. 13, 2000.
Preliminary Amendment, U.S. Appl. No. 08/918,738, 17 pages, Aug. 15, 1997.
Non-Final Office Action, U.S. Appl. No. 08/918,738, 9 pages, Dec. 23, 1997.
Non-Final Office Action, U.S. Appl. No. 08/918,738, 14 pages, Jan. 29, 1998.
Interview Summary, U.S. Appl. No. 08/918,738, 2 pages, May 5, 1998.
Amendment and Response to Final Office Action, U.S. Appl. No. 08/918,738, 14 pages, Jun. 29, 1998.
Final Office Action, U.S. Appl. No. 08/918,738, 10 pages, Jul. 24, 1998.
Amendment and Response to Final Office Action, U.S. Appl. No. 08/918,738, 8 pages, Sep. 24, 1998.
Advisory Action, U.S. Appl. No. 08/918,738, 1 pages, Sep. 30, 1998.
Preliminary Amendment, U.S. Appl. No. 08/918,738, 11 pages, Nov. 24, 1998.
Non-Final Office Action, U.S. Appl. No. 08/918,738, 6 pages, Mar. 26, 1999.
Amendment and Response to Final Office Action, U.S. Appl. No. 08/918,738, 5 pages, Sep. 27, 1999.
Final Office Action, U.S. Appl. No. 08/918,738, 6 pages, Sec. 16, 1999.
Preliminary Amendment, U.S. Appl. No. 08/918,738, 12 pages, Jun. 15, 2000.
Notice of Allowance, U.S. Appl. No. 08/918,738, 2 pages, Jun. 29, 2000.
Non-Final Office Action, U.S. Appl. No. 08/781,863, 11 pages, Dec. 11, 1997.
Amendment and Response to Non-Final Office Action, U.S. Appl. No. 08/781,863, 6 pages, Apr. 10, 1998.
Notice of Allowance, U.S. Appl. No. 08/781,863, 4 pages, May 19, 1998.
Supplemental Notice of Allowability, U.S. Appl. No. 08/781,863, 3 pages, Jun. 25, 1998.
Amendment Under Rule 1.321, U.S. Appl. No. 08/781,863, 17 pages, Aug. 19, 1998.
Non-Final Office Action, U.S. Appl. No. 08/308,404, 8 pages, Nov. 2, 1995.
Amendment and Response to Non-Final Office Action, U.S. Appl. No. 08/308,404, 44 pages, Jan. 30, 1997.
Final Office Action, U.S. Appl. No. 08/308,404, 6 pages, May 15, 1997.

* cited by examiner

ROTATABLE AND PIVOTABLE CONNECTOR

RELATED APPLICATIONS

This application claims the benefit of U.S. Provisional Application No. 60/511,253, entitled "Rotatable and Pivotable Connector" and filed Oct. 14, 2003, which is incorporated herein by reference in its entirety. This application also relates to U.S. Pat. No. 5,865,378, entitled "Flexible Shower Arm Assembly" and issued on Feb. 2, 1999, which is incorporated herein by reference in its entirety.

BACKGROUND OF THE INVENTION

1. Technical Field

The invention relates generally to a rotatable connection structure, and more specifically to a rotatable and pivotable connector having an interior passageway permitting communication of fluids, solids, and gases therealong and an exterior fitting resisting disconnection of adjacent connectors.

2. Background Art

Many ball-and-socket connectors are presently in use. Generally, many of these connectors suffer from the same problem: under sufficient force, the ball of a first connector disconnects from the socket of an adjacent connector. Structurally, the socket external end may impact a surface (such as the outer socket wall of the first connector). As pivoting force is exerted on the interconnected connectors, the socket external end and impacted surface may act as a fulcrum to dislodge, or "pop," the interconnected ball out of the socket.

Several approaches have been taken to rectify this problem. One approach is disclosed in U.S. Pat. Nos. 6,042,155 and 5,449,206, both to Lockwood. An example of two interlinked Lockwood ball-and-socket connectors 1, as disclosed in the Lockwood patents, is shown in cross-section in FIG. 1. These connectors 1, however, are relatively structurally complex, requiring an inner annular ring 2 projecting into a passageway 3 defined through the middle of the connector 1. Not only does such complexity increase manufacturing costs, but the inner annular ring 2 may serve as a limitation on the diameter of items passing through the passageway 3 (for example, a hose or tube), or may trap such items between the annular ring 3 and an inner wall 4 of the connector 1.

Multiple ball-and-socket connectors may be connected to form a single, flexible arm. The individual connectors in the arm may rotate, pivot, flex, and twist with respect to one another, and the arm may be bent into a variety of shapes and positions. Accordingly, it may be desirable to fit adjacent connectors to one another in such a manner as to permit the arm to maintain a bent position. The ability to remain stationary and support a load (without the application of tools, external supports, locking devices, and so forth) may be useful in many applications.

With respect to the many ball-and-socket connectors manufactured from polymer resins, the ability of a flexible arm to retain an attached load while in a bent or flexed position is dependent on a frictional fit between adjacent connectors. With time, the connectors may loosen, and the friction generated between adjacent connectors may diminish. In turn, this may cause the arm to bend undesirably under stresses it once may have been able to withstand. This bending is generally due to a phenomenon known as "creep." Creep occurs when moving parts are subjected to a constant or intermittent load and, as a result of that load, gradually relax and loosen as mentioned above.

Over time, creep may cause interconnected ball-and-socket connectors to deform. A socket may distort, taking on an elliptical shape in order to relax the relatively constant strain under which it is placed. Similarly, a ball nestled within the socket may continue to apply a load force to the socket, which eventually results in the ball disengaging from the socket. This may be especially common where the arm maintains a non-linear shape for an extended time. Among other disadvantages, creep and resulting distortion may minimize the load capability, stationary holding force, and bending radius of a flexible arm.

Accordingly, there is a need in the art for an improved pivotable connector.

SUMMARY OF THE INVENTION

Generally, one embodiment of the present invention takes the form of a connector having a female end defining an interior socket cavity and open socket external end, the interior socket cavity in communication with the connector exterior via the socket external end, a male end defining an interior ball cavity and open ball external end, the interior ball cavity in communication with the connector exterior via the ball external end, a neck joining the male and female ends, and an exterior retention element located about an exterior of the female end.

The exterior retention element, such as, for example, a fitting, may restrict or limit the expansion of the female end of the connector. Such limitation may help prevent the female end of the connector from becoming disengaged from a male end of an adjacent connector. Alternately, the exterior retention element may help retain a fitting on the exterior of the female end of a connector.

In some embodiments, the connector may have a hollow neck, thus allowing the connector to define a passage within the connector from the male end to the female end.

Furthermore, multiple connectors may be interlinked by way of ball and socket to form an arm. When each of the connectors defines a passage, a continuous passage is formed through the length of the arm.

Additional embodiments and advantages of the invention will be realized by those skilled in the art upon reading the detailed description of the invention.

DETAILED DESCRIPTION OF THE INVENTION

Figure 1:
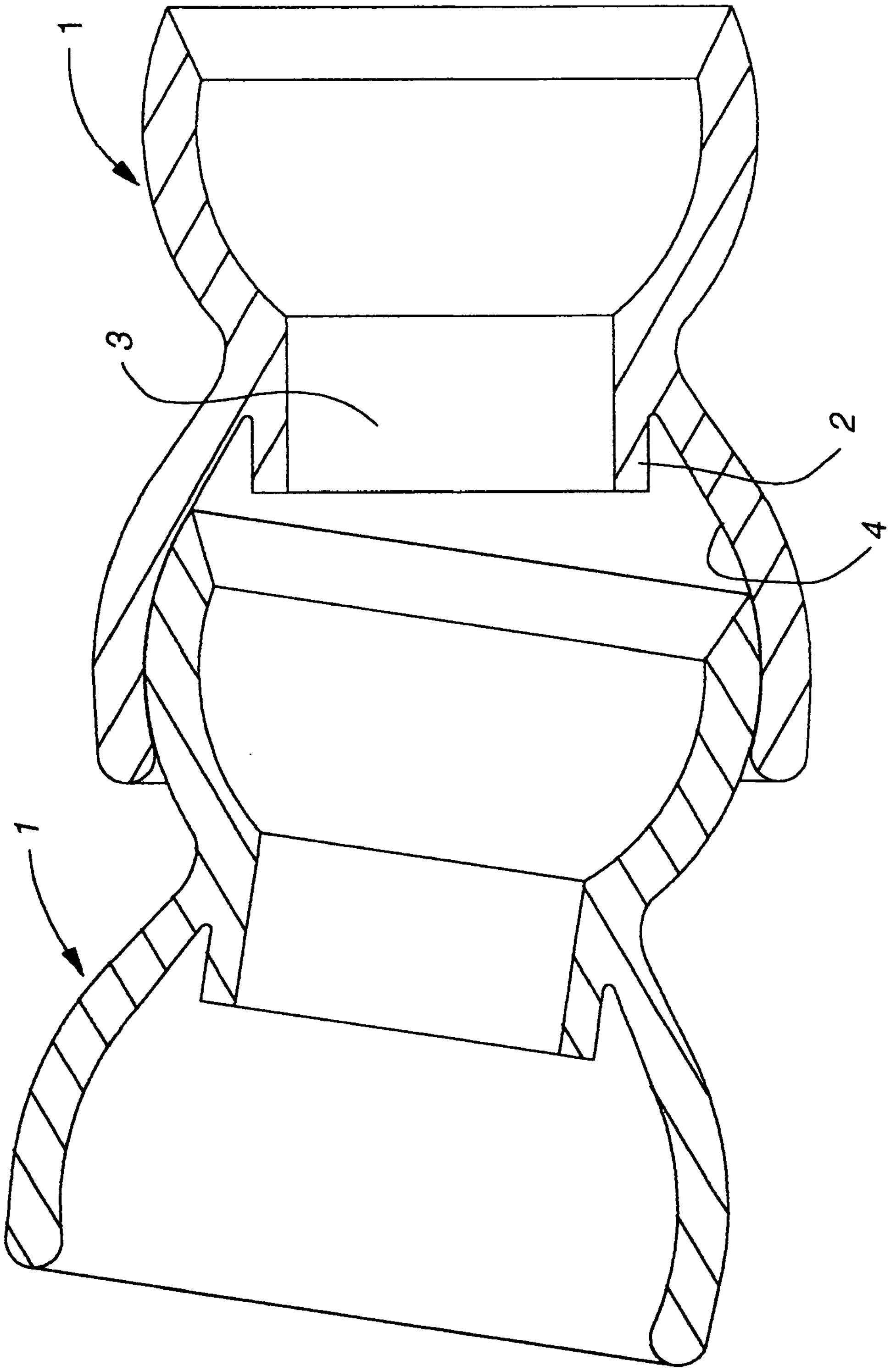
Fig. 1 Prior Art
FIG. 1 depicts a cross-sectional view of two interlinked prior art ball-and-socket connectors.

1. Overview and Structure of the Connector Body

Generally, one embodiment of the present invention takes the form of a hollow connector. The connector, depicted in cross-section in FIG. 2, includes a connector body 10 (or colloquially, "bead") having a male end 12 and a female end 14, as well as an optional external fitting (not shown in FIG. 2). The male end 12 of the connector may be referred to as a "ball," and the female end 14 as a "socket." Both the ball 12 and socket 14 are typically externally convex. The joinder between the male and female ends defines a narrowed portion or neck 16 of the bead 10, with both the ball 12 and socket 14 generally narrowing in lateral cross-section approaching the neck 16. For reference and as used herein, the longitudinal axis of the connector extends from the ball to the socket or vice versa, while the lateral axis of the connector is perpendicular to the longitudinal axis.

Figure 2:
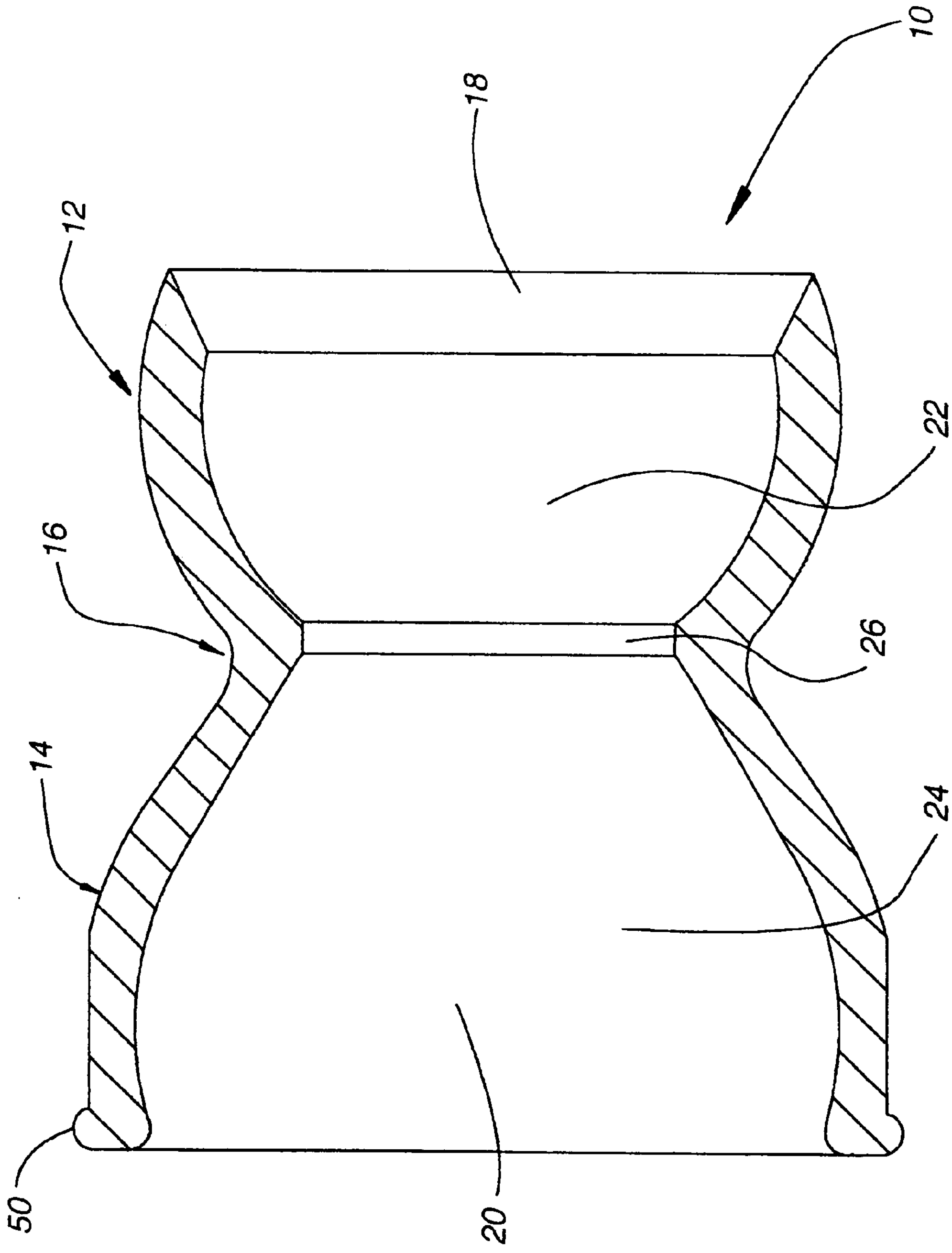
FIG. 2 depicts a cross-sectional view of a connector body, in accordance with an embodiment of the present invention.

The connector body 10 is generally hollow throughout its interior, as shown in FIG. 2. The male end 12 defines an interior ball cavity 22, while the female end 14 defines an interior socket cavity 24. Further, these cavities 22, 24 are linked together by way of a neck hollow 26 and define a passage linking the ball and socket of the connector. Accordingly, the neck 16 is also hollow. Also, both the male and female portions 12, 14 are open at their external ends (i.e., an open ball external end 18 and an open socket external end 20), or the ends directly opposite the neck. Thus, the passage communicates with the exterior of the bead on both the male and female ends. In alternate embodiments, the neck 16 may be solid, thus isolating the open ball external end 18 from the open external socket end 20.

Figure 2A:
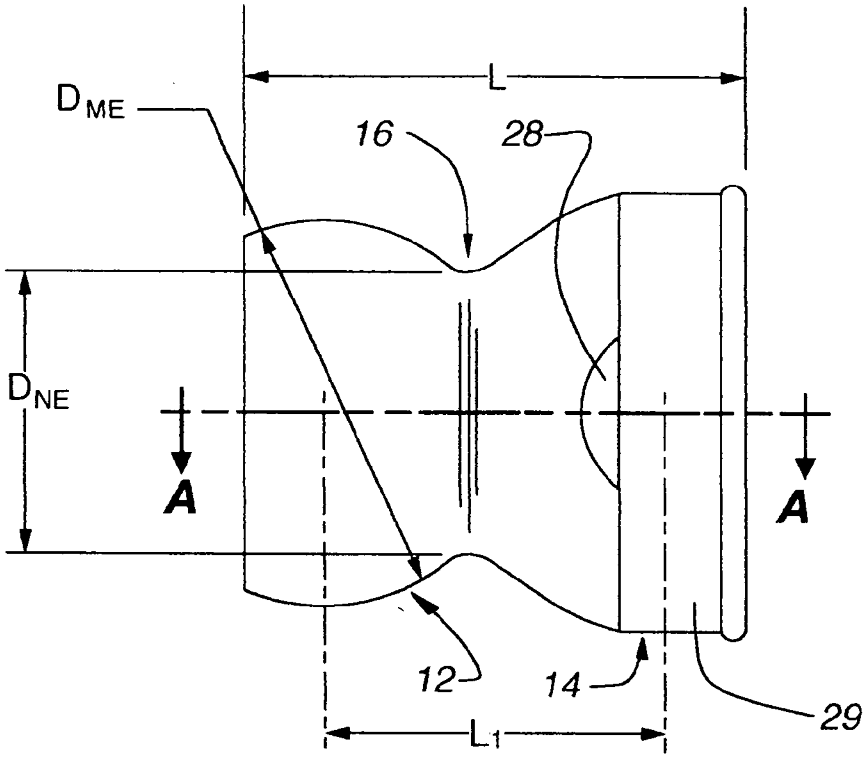
FIG. 2A depicts a side view of the connector of FIG. 2.
Figure 2B:
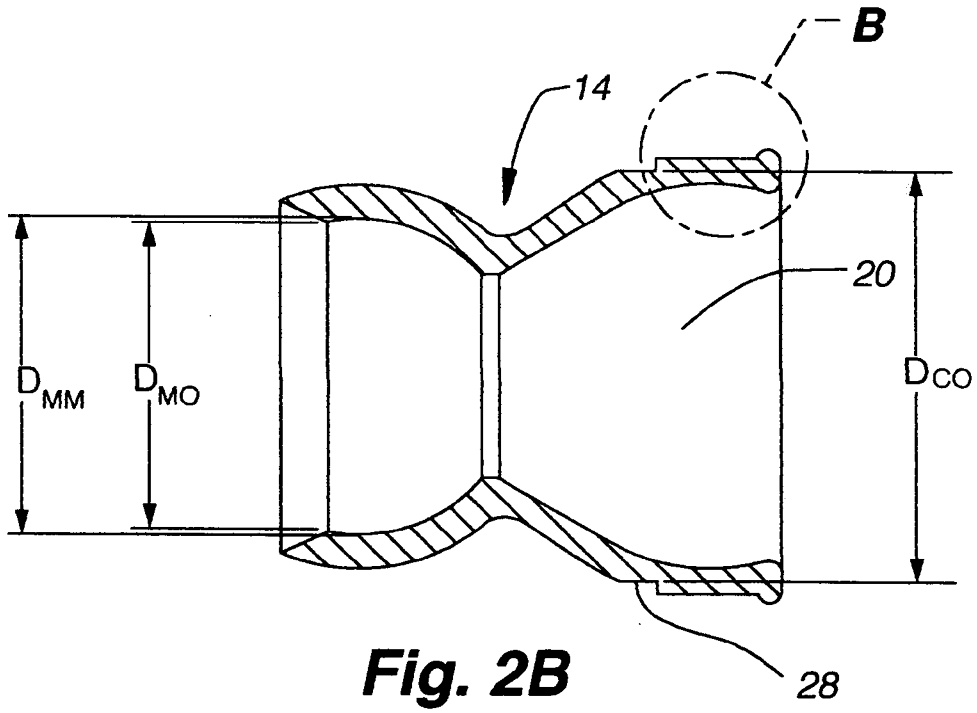
FIG. 2B depicts a cross-sectional view along line A-A of FIG. 2A.
Figure 2C:
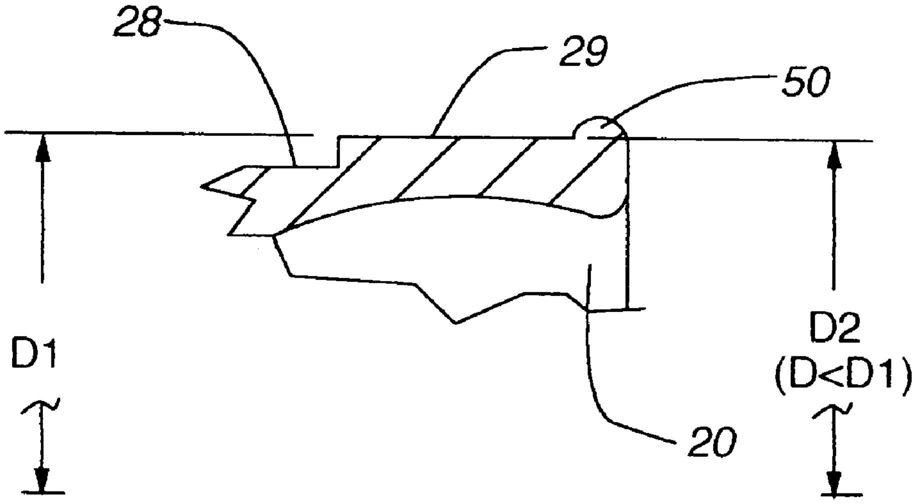
FIG. 2C depicts a cross-sectional view of the inset B of FIG. 2B.
Figure 2D:
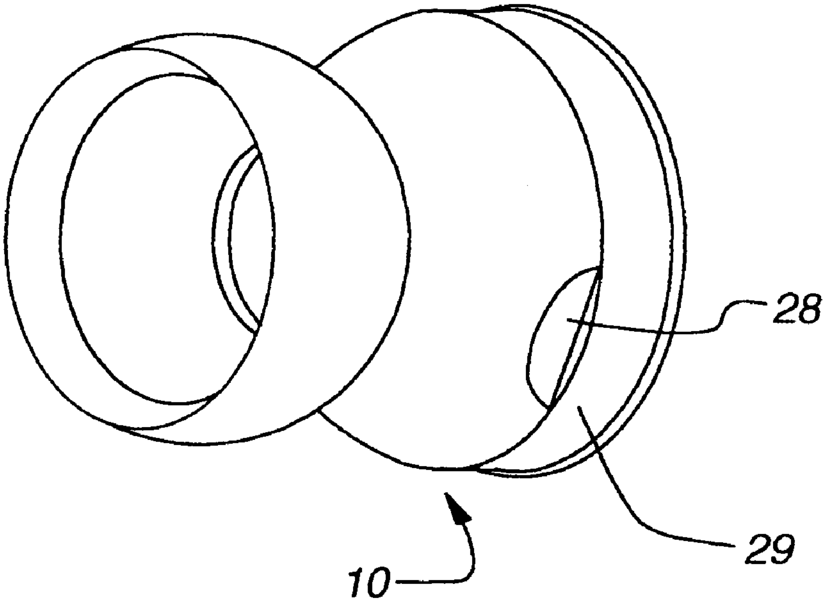
FIG. 2D depicts a perspective view of the connector of FIG. 2.

FIGS. 2A, 2B, 2C and 2D provide various views of the connector body 10 of FIG. 2. FIG. 2A depicts a side view of the connector body 10, which has an overall length L of about 1.4 inches, a male end 12 exterior diameter $D_{ME}$ of about 1.1 inches, and a neck 16 exterior diameter $D_{NE}$ of approximately 0.79 inches. Also, a length $L_1$ from the point of the maximum exterior diameter of the male end 12 to a point on a seat point 29, described below, is about 0.96 inches. FIG. 2B depicts a cross-sectional view taken along line A-A of FIG. 2A. In this view, the maximum diameter $D_{MM}$ of the interior ball cavity is shown, measuring about 0.895 inches. The diameter $D_{MO}$ of the interior ball cavity at the open ball external end is approximately 0.881 inches. Further, the diameter $D_{CO}$ of the connector body at the cutout portions 28, described in greater detail below, is about 1.15 inches. FIG. 2C is a magnified view of the inset B indicated in FIG. 2B. Finally, FIG. 2D depicts a perspective view of the connector body 10. It should be understood that the particular dimensions of the embodiment of FIGS. 2A through 2D are intended by way of illustration and not limitation; alternate embodiments of the connector body of FIG. 2 may have differing measurements.

As shown on FIGS. 2A through 2D, the connector body 10 may include one or more cutout portions 28. These cutout portions 28 define recesses in the connector exterior, and generally are bounded on one side by a flat, cylindrical portion of the connector body referred to as a "seat point" 29, which is discussed in more detail below. These recesses may permit a tool to more easily place a fitting around the connector body 10. Fittings are also discussed in more detail below. The cutout portions 28 are optional, and for example are not shown in the embodiments of FIGS. 3, 4, and 6-8, to be discussed below.

Returning to FIG. 2, the female end 14 of the connector body 10 is typically sized to receive a male end 12 of an adjacent connector. The fit between the female end 14 and male end 12 of an adjacent connector is generally a friction fit, permitting the interconnected beads 10 to move relative to one another, but fixedly holding the beads once the beads are configured in a desired position. That is, the exterior sidewall of the male end 12 of a first bead generally contacts the interior sidewall of the female end 14 of a second bead, when the first and second beads mate. In alternate embodiments, a fitting may be used to compress the female end 14 to provide the friction fit. Interconnected beads 10 may both pivot and rotate.

Typically, the widest external portion of the ball 12 is formed at or around the middle of the ball, while the widest internal portion of the socket 14 is formed slightly towards the neck 16 from the open socket end 20. In alternate embodiments, the widest internal portion of the socket 14 may be at the socket midpoint. Both the male and female connector ends 18, 20 may taper internally and/or externally along their lengths in either or both directions from their midpoints. Further, the opening 20 at the female end 14 may be slightly smaller in diameter than the widest portion of the male end 12, thus requiring the male end 12 to be snapped or forced into the female end 14. Such snap-fitting of beads 10 may create the aforementioned friction fit, facilitating the connection between adjacent beads.

As also shown in FIG. 2, the passage within the bead 10 is generally free of obstructions, jutting or protruding elements, or other impediments extending inwardly into the bead interior. Accordingly, with respect to a single bead 10, items may freely pass through the bead interior without being blocked (either partially or fully) by portions of the bead 10. The generally curved inner sidewalls of both the ball 12 and socket 14 define circularly sloping passage walls leading to the neck interior, thus minimizing abruptly-angled discontinuities in the passage. The sloped interior and lack of inwardly-protruding elements facilitates passing items (such as cable, conduit, wiring, fluid, tubing, and so forth) through the bead interior. It should be noted that alternate embodiments of the connector body 10 may place a seal or inner wall at some point along the passage to seal the ends of the passage off from one another.

Generally speaking, the connector body 10 may be fabricated from a variety of materials. The bead 10 may be formed, for example, from a variety of plastics, such as various polyesters and polyvinylchlorides. More specifically, a bead 10 may be formed from a thermoplastic such as acetal. Typically, the bead material is relatively durable. Accordingly, suitable materials for manufacture include metals, wood, and ceramics. The bead 10 may also be manufactured from composite materials, such as a plastic impregnated or coated with TEFLON or another friction-reducing compound.

In embodiments having sockets 14 adapted to snap-fit onto a ball 12 of an adjacent connector, the resiliency of the connector body 10 may be a factor in choosing the material of manufacture. For example, the more resilient the material, the more likely the socket 14 will return to its original shape after a ball 12 of an adjacent connector has been snap-fit into the socket 14. However, excessive resiliency may also result in possible premature disconnection of the socket 14 from the ball 12 due to stress applied to the connection.

2. Press-Fit Fitting

Figure 3:
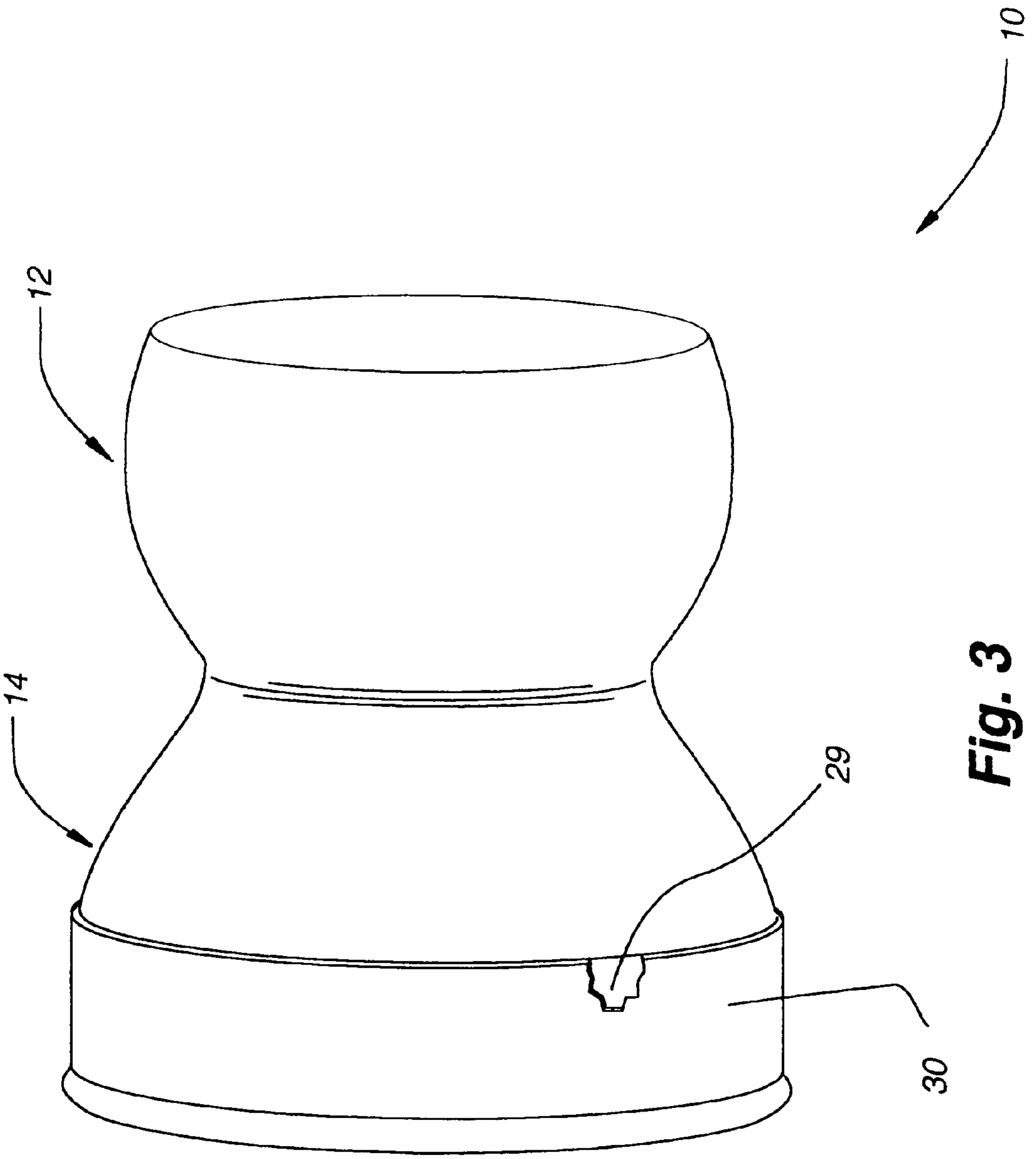
FIG. 3 depicts an exterior view of a connector, showing a fitting encircling the connector body of FIG. 2.

FIG. 3 depicts an exterior view of a connector. As can be seen, a press-fit fitting 30 encircles the socket 14 of the connector body 10. Generally, the fitting 30 limits expansion of the exterior of the socket 14, thereby facilitating a tight connection between the socket 14 and ball of an adjacent connector (not shown in FIG. 3). The fitting 30 may also compress the ball of the adjacent connector to provide additional strength to the connection between the socket 14 and the ball. In either case, the fitting 30 serves as an exterior retention element by at least limiting the expansion of the exterior of the socket 14. Although the fitting 30 is depicted in FIG. 3 as having a break or hole in its exterior portion, it should be understood that the hole is shown solely to illustrate the seat point 29, below. Most (although not all) embodiments of the fitting 30 have a continuous surface.

The fitting 30 is typically press-fitted on the connector, and is sized to fit relatively snugly around the socket 14. To resist expansion of the socket 14, the inner diameter of the fitting 30 is generally equal to the exterior diameter of the socket 14. In order to compress the socket 14, the inner diameter of the fitting 30 is generally slightly smaller than the exterior diameter of the socket 14 so that the socket is compressed when the fitting 30 is press-fitted onto the female end 14. Because the male end 12 generally has an exterior diameter smaller than the female end's exterior diameter, the fitting 30 may be placed over the male end 12 of the connector body 10 during the press-fitting operation without compressing or interfering with the male portion 12.

The fitting 30 passes across the male end 12 and is pushed along the longitudinal axis of the female end 14 until the joinder between the fitting 30 and the female end 14 is sufficiently frictionally snug to hold the fitting 30 in place. When the fitting 30 is finally positioned about the socket 14, expansion force may be applied radially against the fitting 30 by the socket 14. This expansion force, coupled with friction generated between the fitting 30 and socket 14, generally holds the fitting 30 in position and resists any separating forces applied along the connector's longitudinal axis.

As seen in FIG. 2A, the fitting 30 generally seats at a point relatively flat along the connector's exterior circumference. This seat point 29 may alternately be linearly angled slightly inwardly from the external female end 14 towards the neck 16. Such an angle may provide a slight slope to facilitate properly positioning and retaining the fitting 30.

As shown in FIG. 2C, the seat point 29 in some embodiments of the connector is slightly tapered towards the open end of the socket 14. For example, the connector shown in FIG. 2C has an external diameter $D_1$ of approximately 1.226 inches at the end of the seat point 29 nearest the neck 16, but an external diameter $D_2$ of 1.218 inches at the end of the seat point 29 nearest the open socket end 20. Alternate embodiments may taper the seat point 29 to a greater or lesser degree, and may employ varying measurements. This seat point taper may assist in minimizing movement of the fitting 30 due to the aforementioned creep.

Figure 3C:
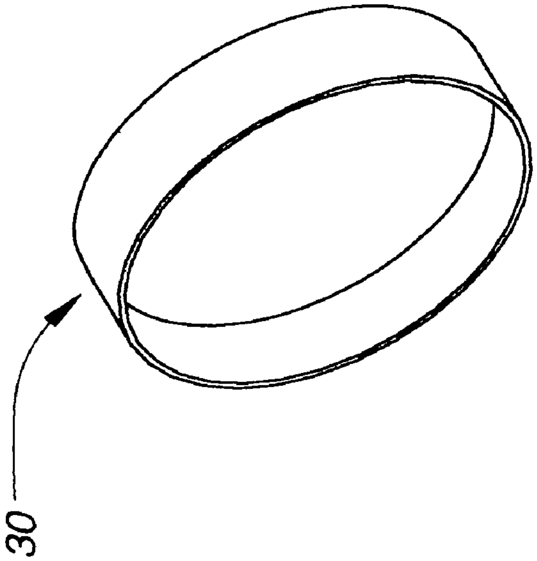
FIG. 3C depicts a perspective view of the fitting of FIG. 3.
Figure 3B:
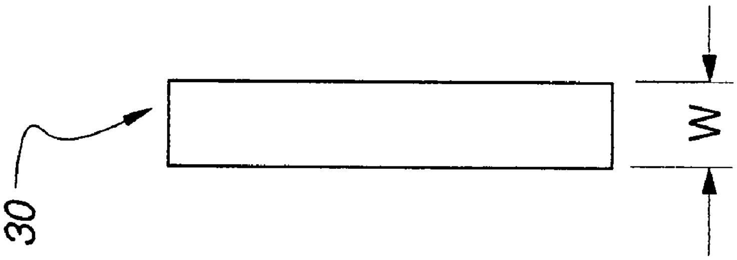
FIG. 3B depicts a side view of the fitting of FIG. 3.
Figure 3A:
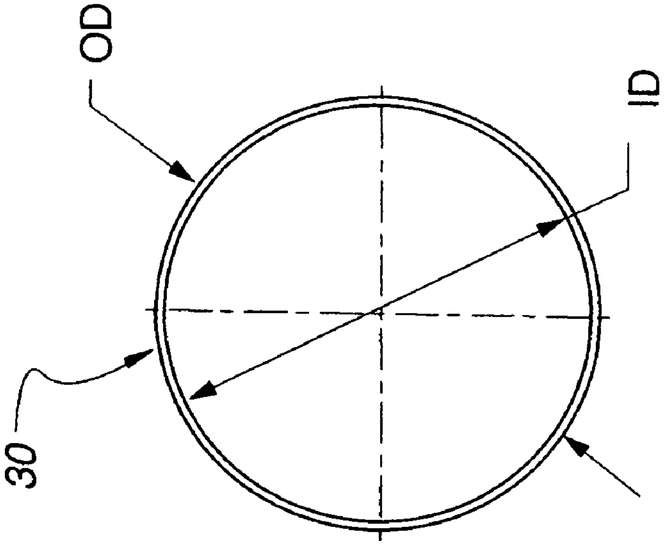
FIG. 3A depicts an end view of the fitting of FIG. 3.

FIGS. 3A through 3C depict multiple views of the fitting 30 of FIG. 3. More specifically, FIG. 3A provides an end view, FIG. 3B depicts a side view, and FIG. 3C displays a perspective view. In the particular embodiment shown, the fitting 30 possesses an outer diameter OD of about 1.24 inches and an inner diameter ID of about 1.21 inches. Further, the width W of the fitting 30 is approximately 0.25 inches. However, it should be understood that the measurements discussed herein with respect to the fitting are illustrative, rather than limiting. Generally, the fitting 30 is sized to mate with the connector body 10 shown in FIGS. 2A through 2D. Alternate embodiments of the connector body 10 and/or fitting 30 shown in FIG. 3 may have differing measurements.

Figure 4:
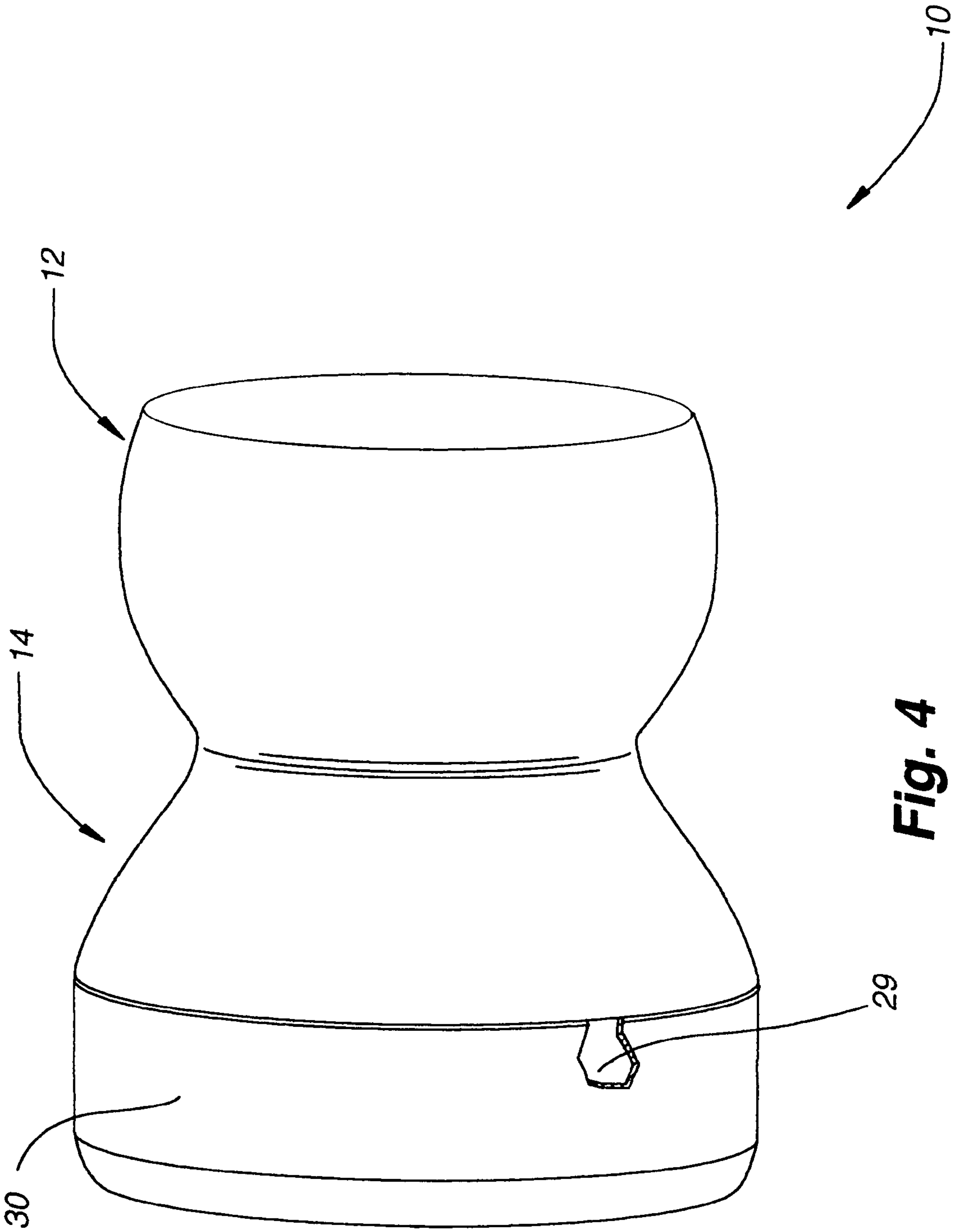
FIG. 4 depicts a side view of a snap-fit connector having a female end with a seat point near the socket middle, in accordance with a second embodiment of the invention.

In an alternate embodiment of the invention, such as the snap-fit embodiment mentioned above, the socket 14 may increase in lateral diameter from both the neck 16 and open socket external end 20 towards the socket middle. Accordingly, a linear, non-curved seat point 29 may be defined at or near the section of the socket 14 having the largest lateral diameter. FIG. 4 depicts a snap-fit connector having a female end 14 with a seat point 29 near the socket middle, as compared to the embodiment shown in FIG. 3. It should be noted that the seat point 29 is generally located at a position that will at least partially overlap a ball 12 of an adjacent connector inserted into the socket 14. This facilitates a frictional connection between the socket 14 and the ball 12 of the adjacent connector.

Figure 5:
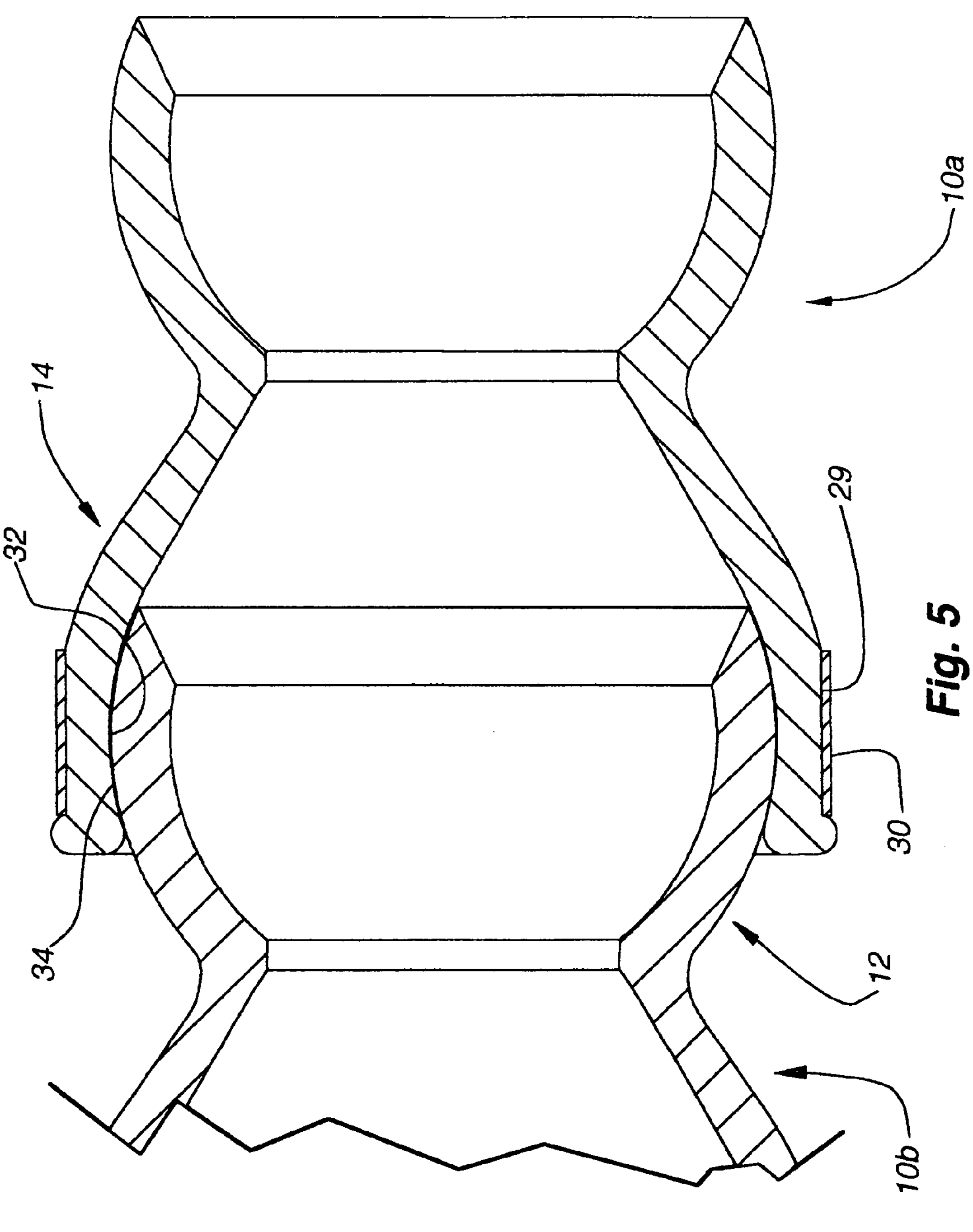
FIG. 5 depicts in cross-section a ball of a first connector nestled within a socket of a second connector, in accordance with the embodiment of FIGS. 2 and 3.

Referring to the cross-sectional view of FIG. 5, regardless of the location of the seat point 29 (and thus the seated fitting 30), the fitting 30 may act to at least slightly compress the socket 14 of a first connector body 10*a*. Alternately, the fitting may simply resist or limit expansion of the socket 14. When the ball 12 of an second connector body 10*b* is inserted into the socket 14 of the first connector body 10*a* and the fitting 30 placed therearound, the fitting 30 may bring at least a portion of the inner surface 32 of the socket wall in contact with the outer surface 34 of the ball wall. It should be noted that the connector bodies 10*a*, 10*b* depicted in FIG. 5 are identical to those shown in FIGS. 2 and 3.

The portions of the inner socket wall 32 and outer ball wall 34 in contact with, or adjacent to, one another frictionally resist realignment of the first and second connector bodies 10*a*, 10*b*, thus maintaining positioning of the first and second connectors 10*a*, 10*b* with respect to one another. That is, as a first bead is longitudinally positioned with respect to a second bead by bending, pushing, or twisting, the frictional resistance generated by the previously-mentioned adjacent surfaces typically prevents gravity or other external forces from moving the first and second beads out of their relative positions. Such axial skew is shown in cross-section in FIG. 11, discussed below.

The frictional resistance force may not only maintain longitudinal alignment of two connectors, but may also support a weight or mass attached to one of the connectors. The exact weight supported in a position by an "arm" or series of interconnected connectors depends on the number of connectors between the weight and a support or stabilization point. The greater the number of connectors, the less weight supported along the length of the arm before the torque exerted on at least one bead overcomes the force generated by the frictional fit, thus causing the arm to bend.

However, the tighter the connection between the fittings and the sockets of each bead, the more weight that may be supported. Effectively, tightened fittings and/or closely toleranced male and female ends may increase the frictional force between each ball-and-socket joint in the arm, which in turn permits the arm to support more weight and more easily resist undesired motion.

In an alternate embodiment, the tightness of each fitting in the flexible arm may be individually adjusted, providing variable levels of resistance to undesired motion, such as axial misalignment. For example, fittings may be slightly looser in the middle of the arm, but tighter at each end, thus creating a tendency for the flexible arm to bend in its middle.

In addition to creating or enhancing the aforementioned frictional force between interconnected beads, the fitting may also resist expansion of the socket, which in turn minimizes disconnection of interconnected beads. The press-fit fitting 30, as best shown in FIG. 3A, is essentially a solid hoop or band of material, such as a section of pipe. The fitting may be sized to fit snugly across the socket exterior, thus resisting expansion of the socket, or may be sized to slightly compress the socket exterior, thus providing a compressive force in addition to resisting expansion.

3. Clamp Fitting

Figure 6:
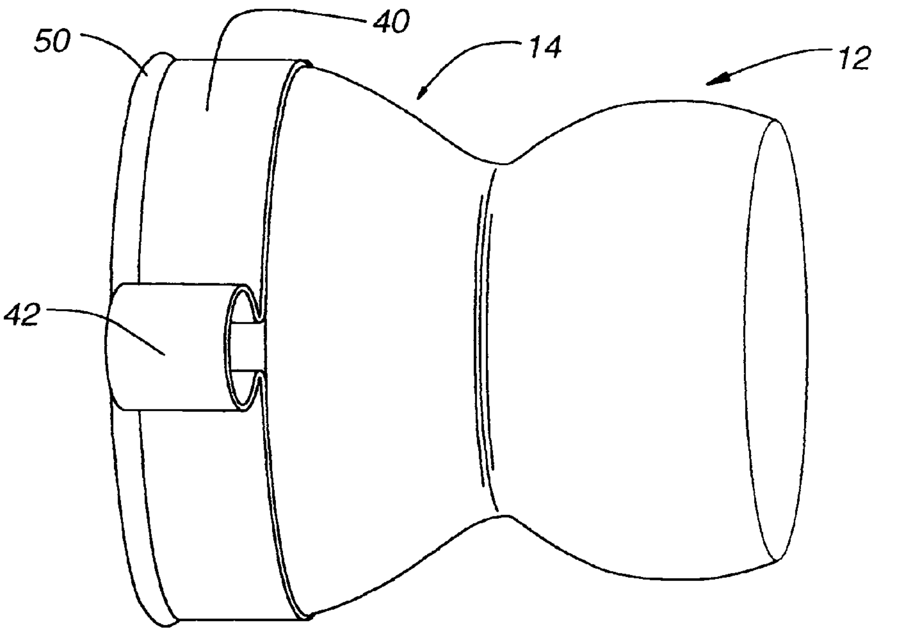
FIG. 6 depicts a side view of a connector, showing a second fitting, in accordance with a third embodiment of the invention.

In addition to the press-fit fitting described above, a clamp fitting may be employed as an exterior retention element in alternate embodiments of the invention. FIG. 6 depicts an exterior view of a connector having a clamp fitting 40 affixed thereto. As can be seen in the figure, a protrusion 42 extends outwardly from the circular portion of the fitting 40, while the interior wall of the circular portion is substantially entirely in contact with the outer wall of the connector socket 14. The clamp fitting 40 may also have a hose-clamp type structure.

Prior to being placed around the connector body 10, the clamp fitting's inner diameter (that is, the diameter of the inner wall of the fitting) is generally sized so that the fitting 40 may be placed around the socket 14 without any portion of the fitting's inner wall contacting the outer wall of the socket 14. Once the fitting 40 is properly aligned both longitudinally and angularly around the socket 14, the fitting 40 is clamped, crimped, or otherwise compressed until a majority of the fitting's inner wall contacts the outer wall of the socket 14. Since the fitting 40 is generally non-elastic and no material is removed during the clamping/crimping process, the fitting's overall size cannot change. Accordingly, the clamping/crimping process forces some portion of the fitting 40 upward and outward from the socket 14 while simultaneously pressing the remainder of the fitting toward the socket, thus creating the aforementioned protrusion 42. As with the press-fit fitting, the clamp fitting 40 generally compresses the socket 14, or at least limits expansion of the socket 14, in the manner described above. This compression results in a frictional relationship between the connector socket and the ball of an adjacent connector, as also previously described.

The above-referenced fittings may be manufactured from a variety of materials, with metals and plastics being common. Press-fit fittings may also be made of rubber or other elastic materials capable of exerting sufficient force on the socket 14 to compress it inwardly, or keep it from expanding.

4. Alternate Connector Bodies

Figure 7:
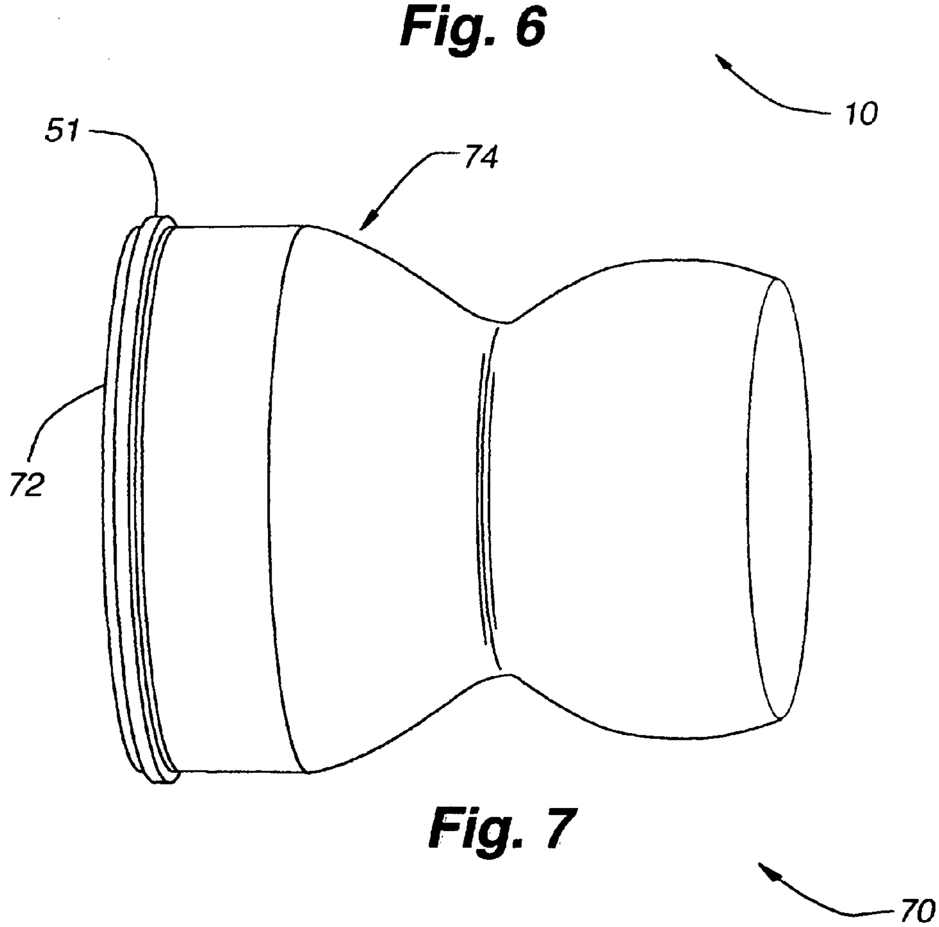
FIG. 7 depicts a side view of a connector having a retainer formed thereon, in accordance with a fourth embodiment of the present invention.

J In addition to the embodiments described above, the connector body 10 may include additional features designed to facilitate the connection between body and fitting. For example, a bump, outwardly-extending annular ring, or step (collectively, "retainer") may be formed towards the rear portion of the socket. The connector shown in FIGS. 2 and 3, as well as the connector of FIG. 6, includes such a retainer 50 on the exterior wall of the socket 14 near the open socket external end 20. A second example of a connector body 70 having a retainer 51 formed thereon is shown in FIG. 7. As can be seen, the retainer 51 extends outwardly from the exterior socket wall.

Generally, and in reference to FIG. 7, the outer diameter of the retainer 51 is at least slightly greater than the inner diameter of an associated fitting 30. Accordingly, once the fitting 30 is placed around the socket 74 of the connector body 70 (whether by press-fitting or clamping), the retainer 51 prevents the fitting 30 from sliding rearwardly along the connector body 70 toward the open socket external end 72. Effectively, the retainer 51 serves to backstop the fitting 30 and assist in keeping the fitting 30 in place. The retainer 51 may also facilitate proper alignment of the fitting 30 around the socket 74 by preventing the fitting from being placed too far to the connector body 70 rear during the press-fitting or clamping processes.

Accordingly, the retainers 50, 51 as described above serve as exterior retention elements. However, while the fittings 30, 40 described above restrict or limit expansion of the exterior of a socket 14, the retainers 50, 51 help retain such a fitting 30, 40 about the socket.

Figure 8:
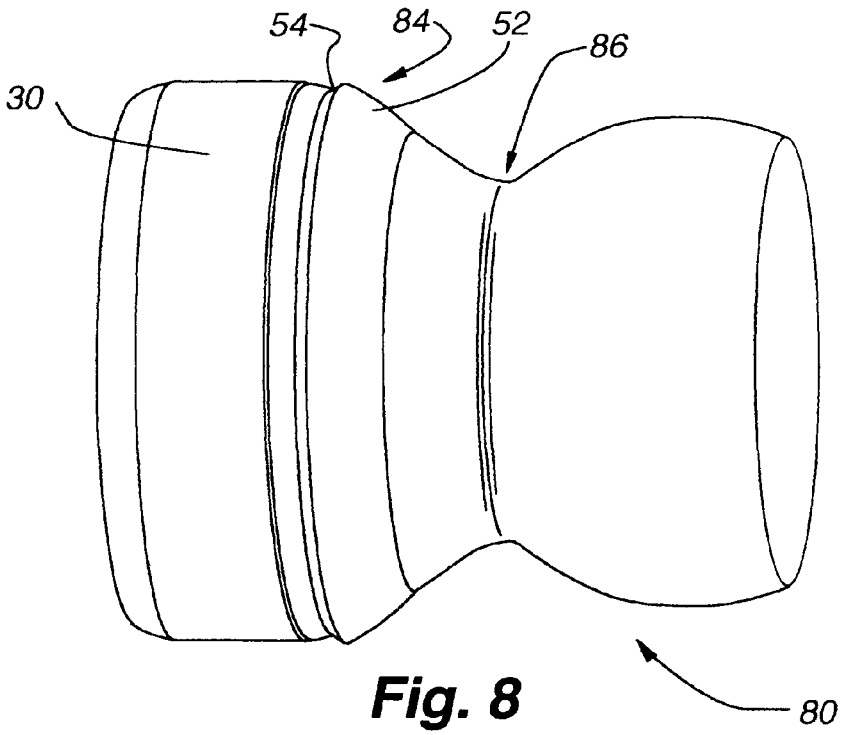
FIG. 8 depicts a side view of a connector having a ramp formed thereon, in accordance with a fifth embodiment of the present invention.

FIG. 8 depicts yet another embodiment of a connector. In this embodiment, a connector body 80 is provided with a ramp 52 extending outwardly from the outer wall of a socket 84. The ramp 52 generally slopes downward toward a neck 86, with a relatively abrupt discontinuity in height ("ledge" 54) formed at the end of the ramp furthest from the neck 86. The ramp 52 prevents the fitting 30 from sliding forward along the connector body 80, towards the neck 86. Once the fitting 30 is properly placed, either by clamping a clamp fitting or sliding a press-fit fitting along the ramp 52 and over the ledge 54, the outer diameter of the ledge 54 typically exceeds the inner diameter of the fitting. Accordingly, the ramp 52 serves to limit forward motion by the fitting 30, in much the same manner the retainer 51 (shown in FIG. 7) limits backward motion. Typically, the ramp 52 is sloped upwardly from the neck 86 and gradually compresses as a press-fit fitting 30 (as shown in the particular example of FIG. 8) travels along the ramp length, thus permitting the press-fit fitting 30 to pass over the ledge 54. Once the fitting 30 is over the ledge 54, the ramp 52 expands substantially back to its original dimensions. This expansion yields a ledge diameter 54 greater than the inner diameter of the fitting 30, thus facilitating keeping the fitting 30 in place. As a result, the ramp 52 and ledge 54 also act as exterior retention elements in a manner analogous to that of the retainers 50, 51 described earlier.

Figure 9:
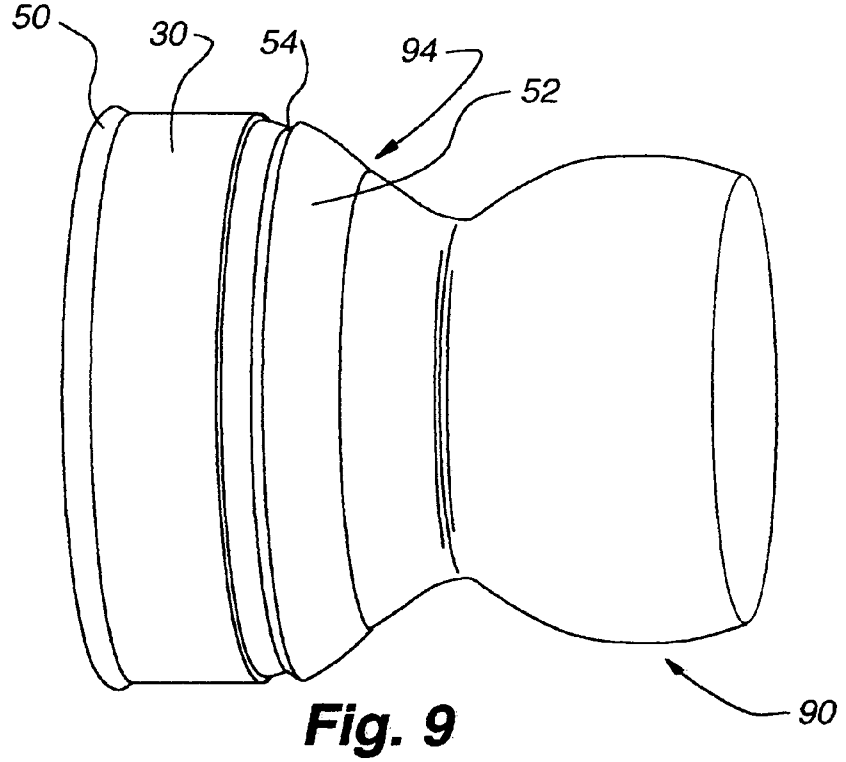
FIG. 9 depicts a side view of a connector having a retainer and ramp formed thereon, in accordance with a sixth embodiment of the present invention.

It should be noted that some embodiments may use both a ramp 52 and a retainer 50, 51 to confine any possible lateral motion of a fitting to a relatively narrow range. FIG. 9 depicts a connector body 90 employing both a ramp 52 and a retainer 50 on the exterior of a socket 94, with a press-fit fitting 30 seated therebetween.

5. Connector Assembly

Figure 10:
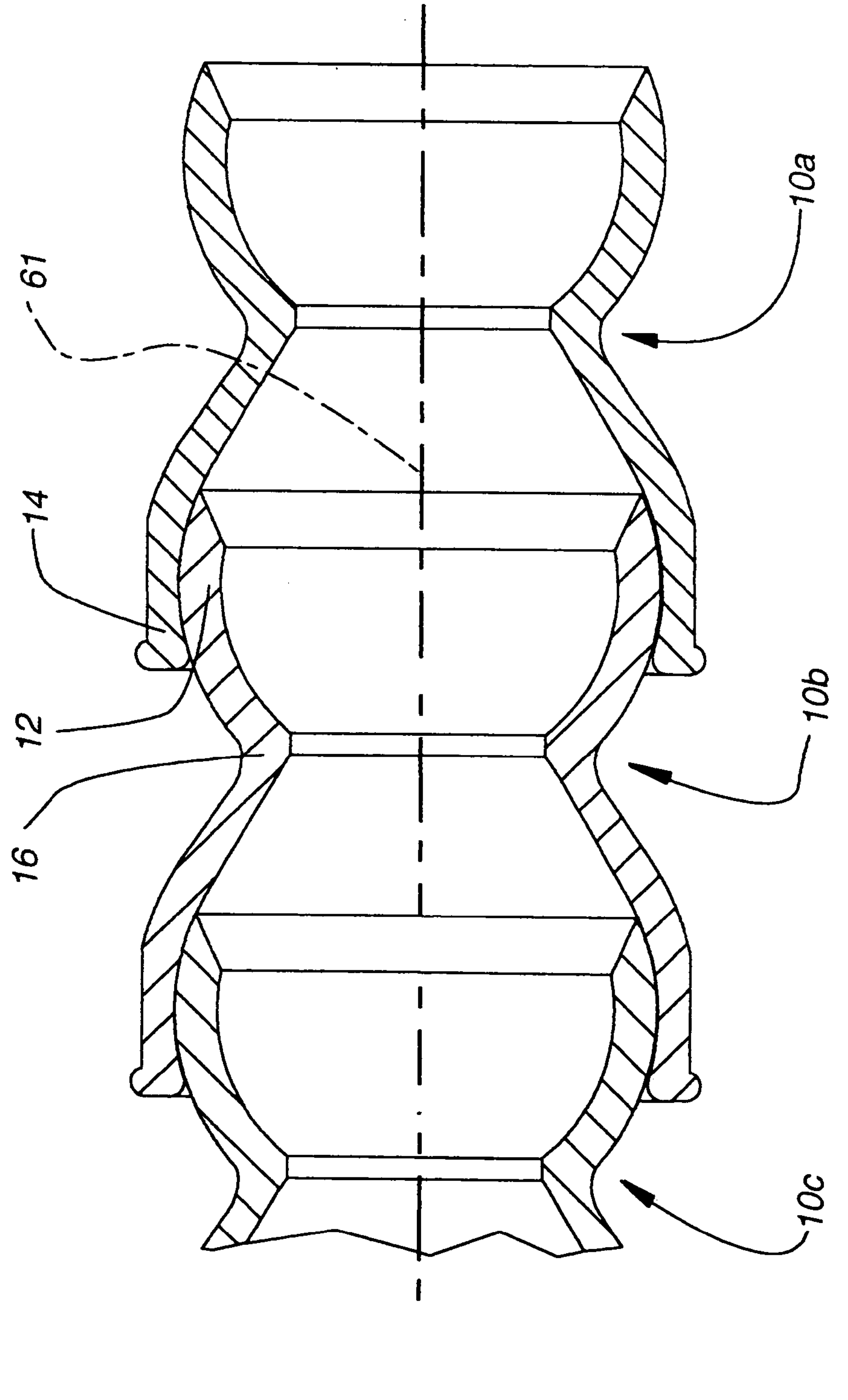
FIG. 10 depicts a partial cross-sectional view of three interconnected connectors, in accordance with the embodiment of FIGS. 2 and 3.
Figure 11:
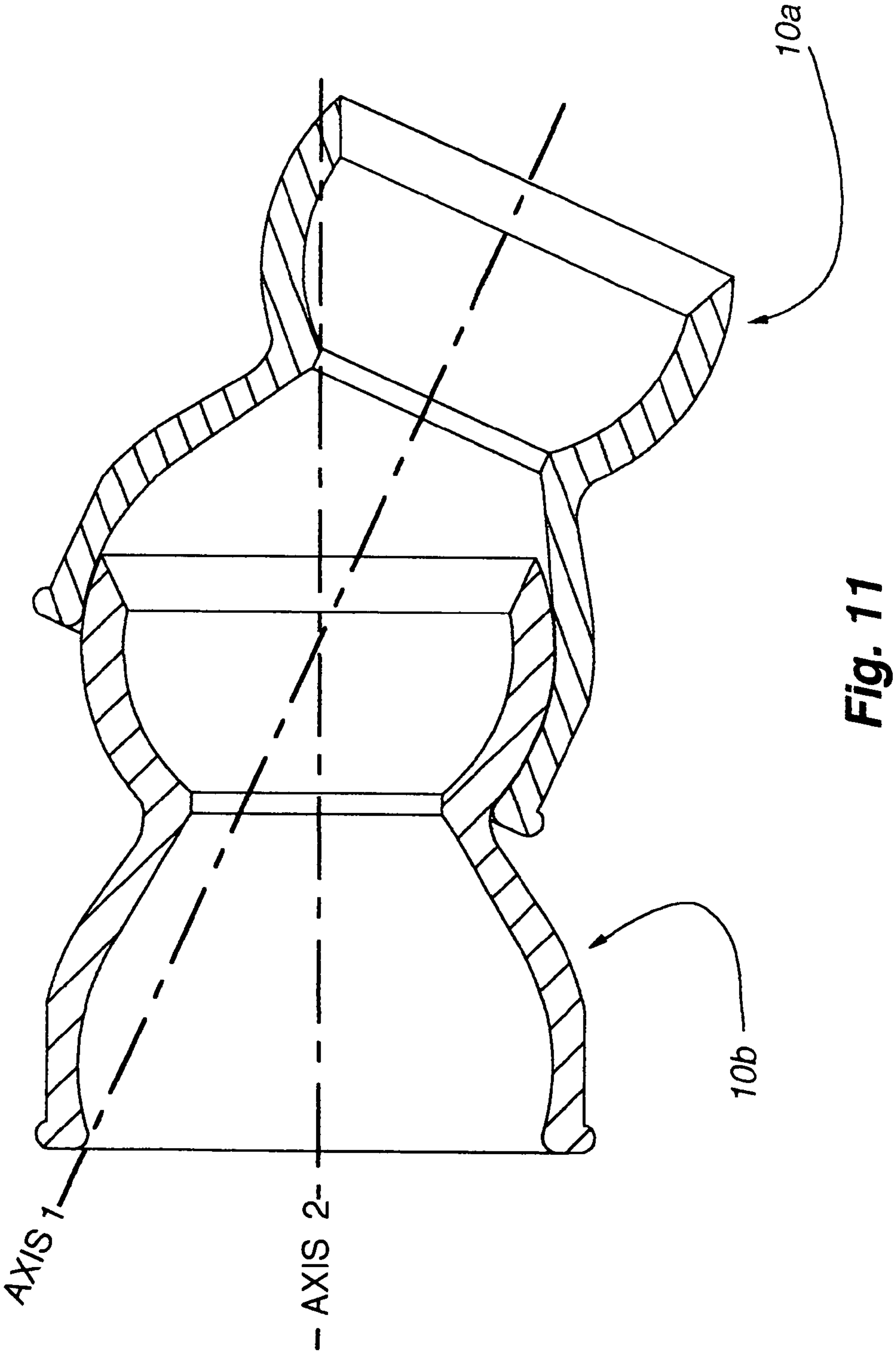
FIG. 11 depicts a cross-sectional view of two axially skewed connectors, in accordance with the embodiment of FIGS. 2, 3, and 10.

Multiple beads may be interconnected to form a flexible assembly, colloquially referred to as an "arm." FIG. 10 depicts a partial cross-sectional view of an arm 60 made from three interconnected beads 10*a-c*. Generally, each of the beads 10*a-c* in the arm 60 may be rotated and/or pivoted with respect to one another or rotated about their longitudinal axes (collectively, "longitudinally skewed"), thus permitting the arm 60 to assume a variety of shapes. Connectors may be longitudinally skewed with respect to one another, but typically the ball of one connector cannot be forced further into, or withdrawn from, the socket of a second, adjacent connector. For example, FIG. 11 depicts two connector bodies 10*a* and 10*b*, each axially skewed with one another, as indicated by a first longitudinal axis Axis1 associated with the first connector body 10*a* and a second longitudinal axis Axis2 associated with the second connector body 10*b*.

Returning to FIG. 10, the pivoting of the first bead 10*a* with respect to the second bead 10*b* is limited by the external end of the female socket 14 of the first bead 10*a* impacting the neck 16 or outer wall of the socket 14 of the second, adjacent bead 10*b*. As described above, in traditional ball-and-socket arrangements this impact may serve as a fulcrum to lever the second connector's male end 12 out of the first connector's female end 14.

The various fittings described herein aid in preventing such disconnection. By restricting expansion or change in dimension of the first connector's socket 14, the fitting prevents the external end of the socket 14 from expanding and releasing the adjacent connector's ball 12 when the socket's external end impacts the neck 16 or outer socket wall of the adjacent connector 10*b*. Since the fitting is typically non-elastic (or minimally elastic), the socket expansion in response to outward pressure exerted by the contained ball 12 is minimal.

As previously mentioned, each individual connector body 10 may define a passage therethrough with openings at both the male 12 and female 14 ends. Accordingly, a continuous passage 61 is defined by multiple interconnected connector bodies 10 forming an arm 60. The continuous passage 61 permits fluids, solids, and gases to be transmitted the length of the arm. Additionally, because the fittings tightly affix the sockets 14 around the various balls 12, the passage is substantially water-tight. The fittings may also minimize squeaking or noise generated by rotating or pivoting the beads 10 with respect to one another, especially after repetitive motion. Generally, the compressive force generated by the fitting minimizes bead distortion and/or creep, which is the source of the aforementioned squeaking. As the friction fit between adjacent beads 10 decreases, the beads 10 may rub against one another, causing chatter and squeaking. Thus, by minimizing creep, squeaking is also minimized.

In addition to fluids, tubing and/or wiring may be passed through the arm's passageway 61. The addition of tubing inside the passageway 61, for example, may permit electrical wiring to be run along the tube interior without concern that bending or twisting of the arm 60 may pinch or otherwise damage wires. However, it should generally be noted that the lack of any protrusions into the passageway 61 interior minimizes the possibility of such pinching or damage, as does the limitation on the range of pivoting motion. Accordingly, a flexible arm 60 made from a series of interconnected connector bodies 10 may be particularly suitable for use in a flexible shower arm, flashlight, or other application requiring a hose or arm capable of maintaining a fixed, user-settable position. One such application is more particularly described in U.S. Pat. No. 5,865,378, entitled "Flexible Shower Arm Assembly." The beads 10, for example, may be combined with the special first and second end beads described therein to form a shower arm. The sheath described therein may also optionally be employed to protect the flexible arm 60 from grit, dust, dirt, and so forth being deposited on the beads 10, which may result in squeaking noises when the beads 10 are manipulated and possibly limit adjacent beads' ranges of motion.

Figure 10B:
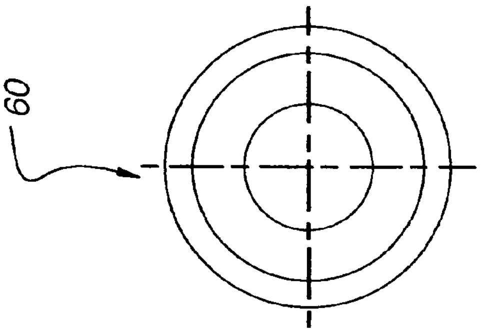
FIG. 10B depicts an end view of the flexible arm of FIG. 10A.
Figure 10A:
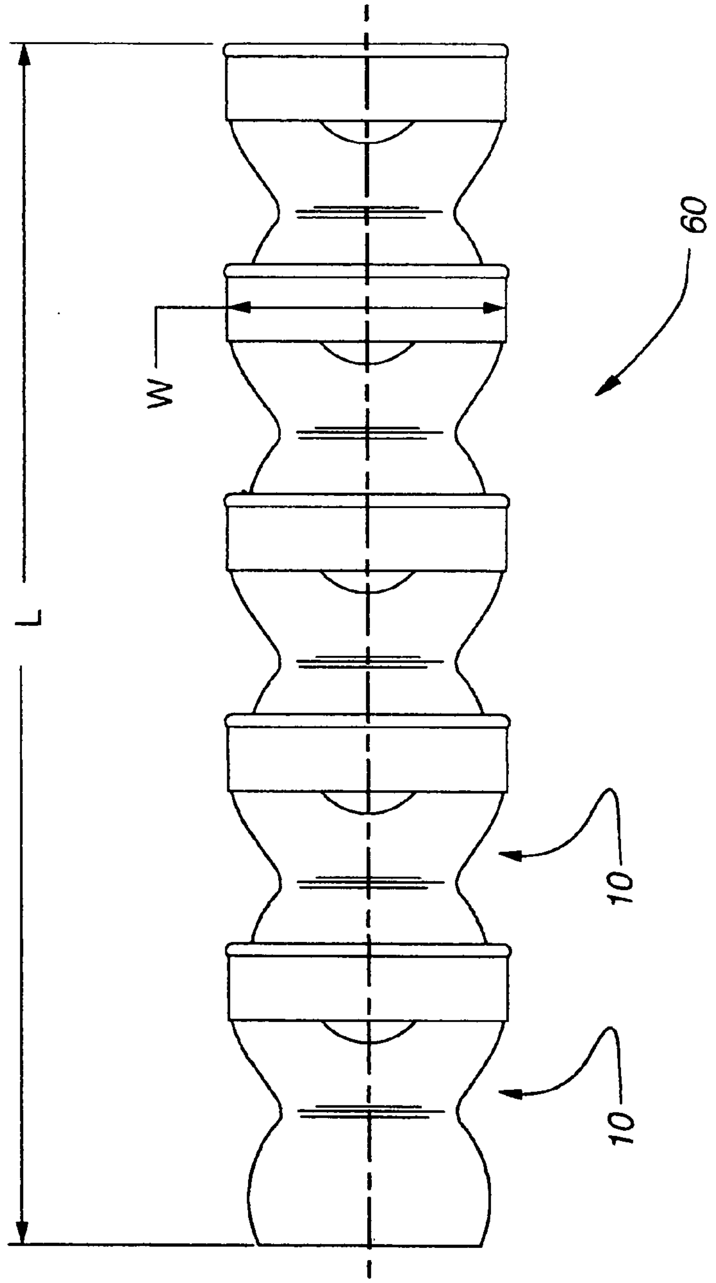
FIG. 10A depicts a side view of a flexible arm made from a series of connectors, such as those shown in FIGS. 2A, 2B and 2C.

FIGS. 10A and 10B depict a flexible arm 60 in side and end views, respectively. The arm 60 is made from a series of five connector bodies 10 as shown in FIGS. 2A through 2D, each with an installed fitting 30 as shown in FIGS. 3A and 3B. In this particular example, the arm 60 possesses a total length L of approximately 5.24 inches, with a width W at the site of a fitting 30 of approximately 1.25 inches. It should be understood that the measurements shown on FIG. 10A are intended by way of illustration and not limitation; alternate embodiments of the flexible arm 60 may have differing measurements.

Figure 12:
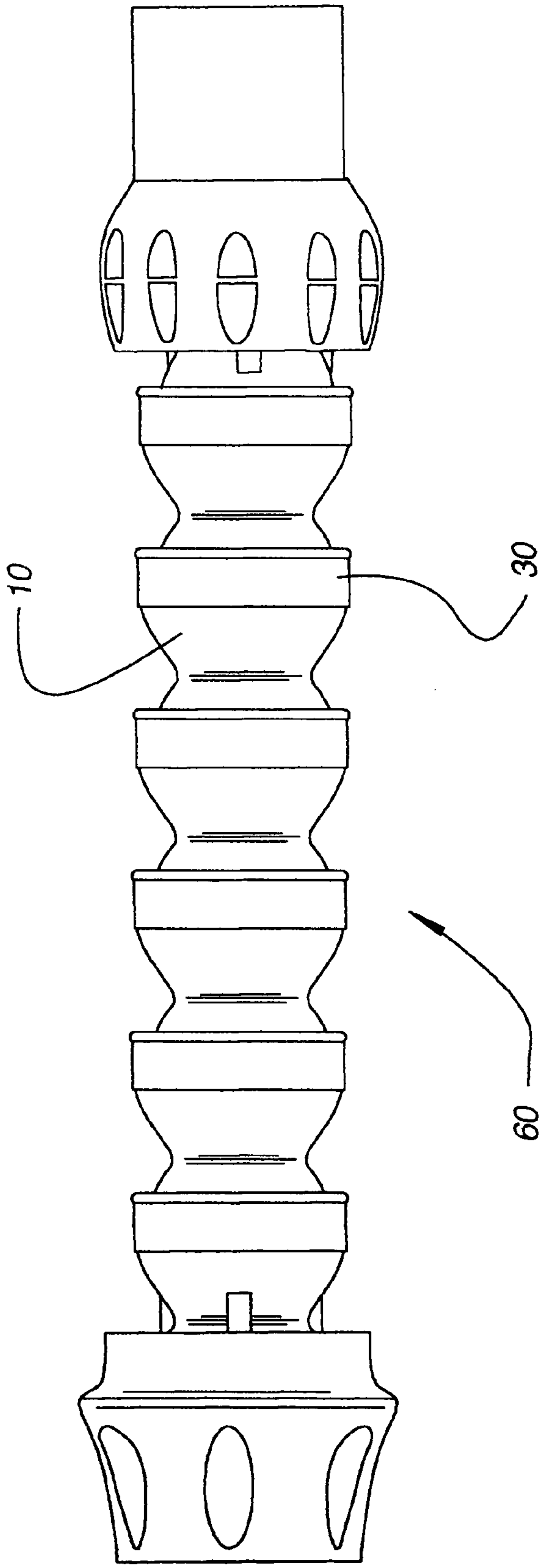
FIG. 12 depicts a flexible arm assembly made of a series of interconnected connectors, in accordance with the embodiment of FIGS. 2 and 3.
Figure 13:
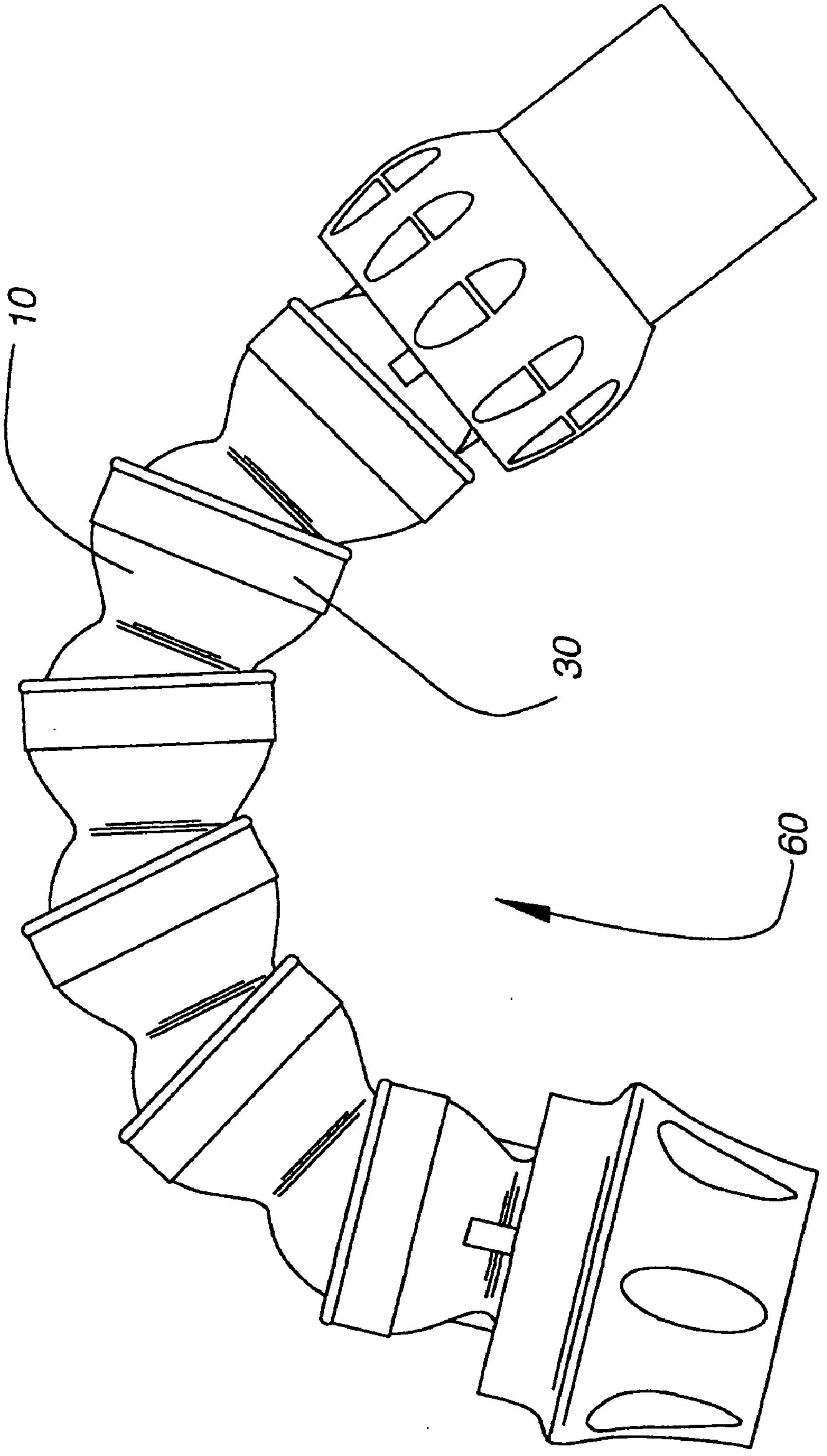
FIG. 13 depicts a flexible arm assembly made of a series of interconnected connectors, in accordance with the embodiment of FIGS. 2, 3, and 12, with the connectors axially skewed.

FIGS. 12 and 13 display a first flexible arm 60 employing connector bodies 10 as described herein. FIG. 12 depicts the first flexible arm 60 with all beads substantially longitudinally aligned, while FIG. 13 depicts the first flexible arm 60 with several beads longitudinally skewed. As can be seen, the first flexible arm 60 employs press-fit fittings 30, as shown in FIG. 3.

Figure 14:
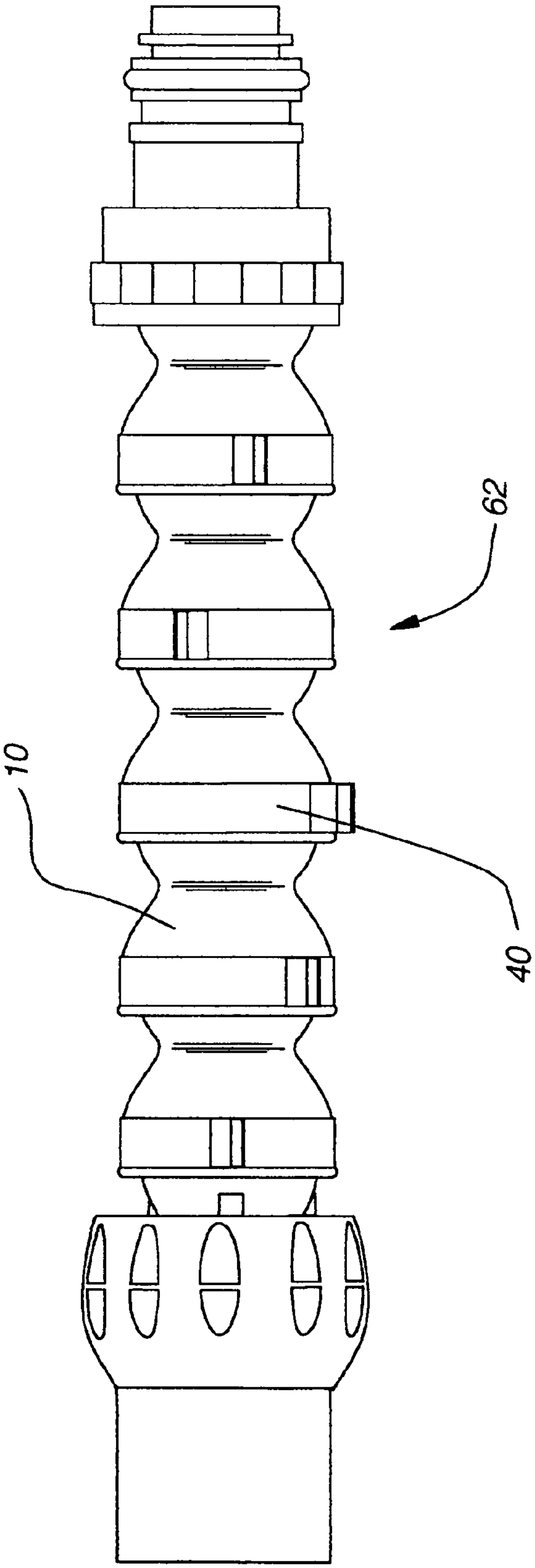
FIG. 14 depicts a flexible arm assembly made of a series of interconnected connectors, in accordance with the embodiment of FIG. 6.
Figure 15:
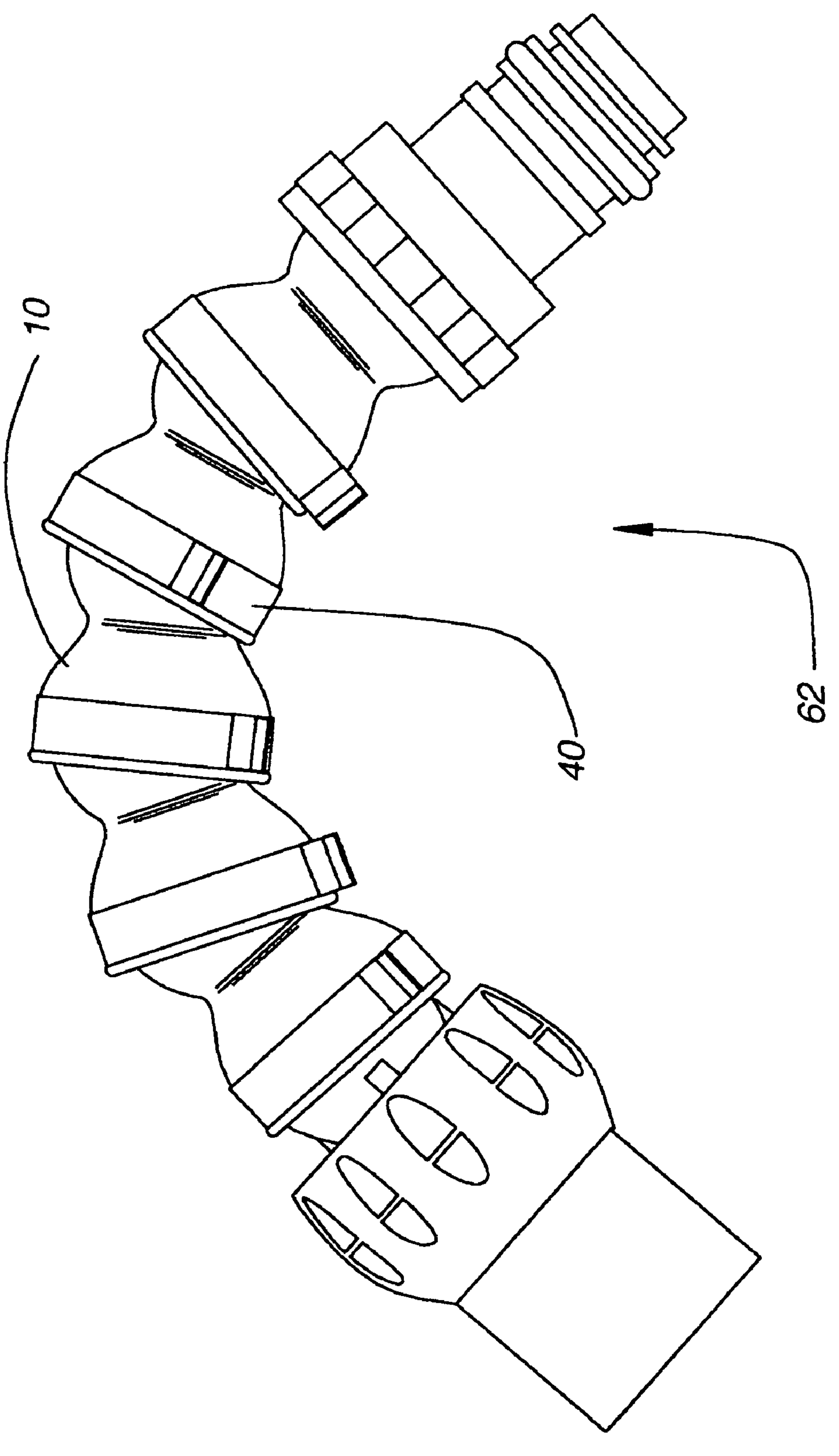
FIG. 15 depicts a flexible arm assembly made of a series of interconnected connectors, in accordance with the embodiment of FIGS. 6 and 14, with the connectors axially skewed.

FIGS. 14 and 15 show a second flexible arm 62 employing connector bodies 10 as described herein. FIG. 14 depicts the second flexible arm 62 with all beads substantially longitudinally aligned, while FIG. 15 depicts the second flexible arm 62 with several beads longitudinally skewed. As can be seen, the second flexible arm 62 employs clamp fittings 40, as shown in FIG. 6.

6. Integrally-Formed Fittings

Figure 16:
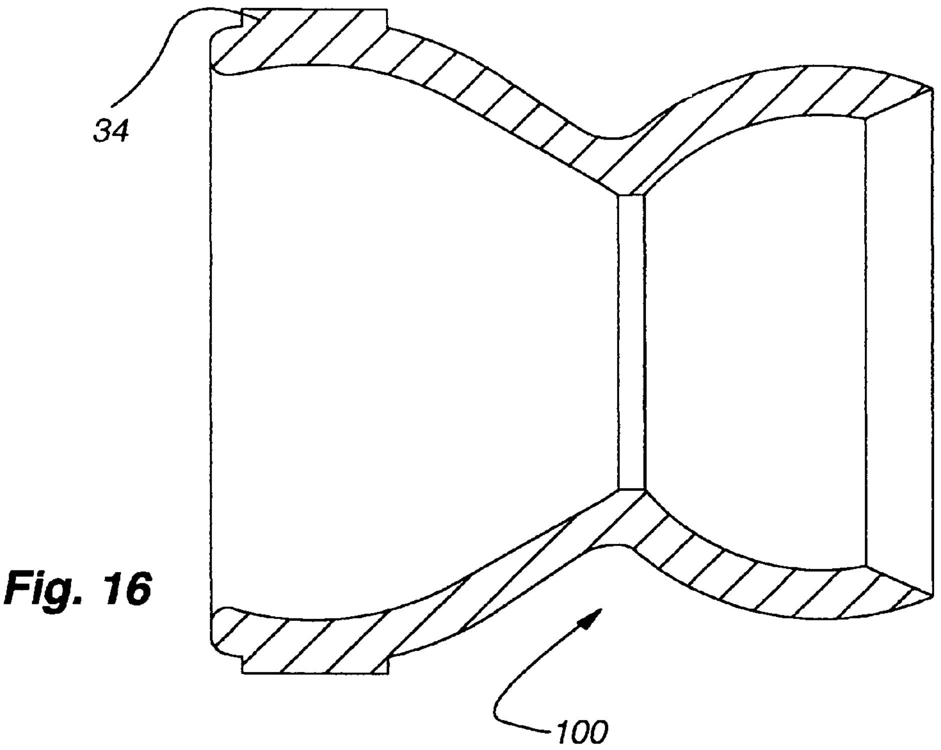
FIG. 16 depicts a cross-sectional view of a connector, showing an integrally-formed fitting, in accordance with a seventh embodiment of the invention.
Figure 17:
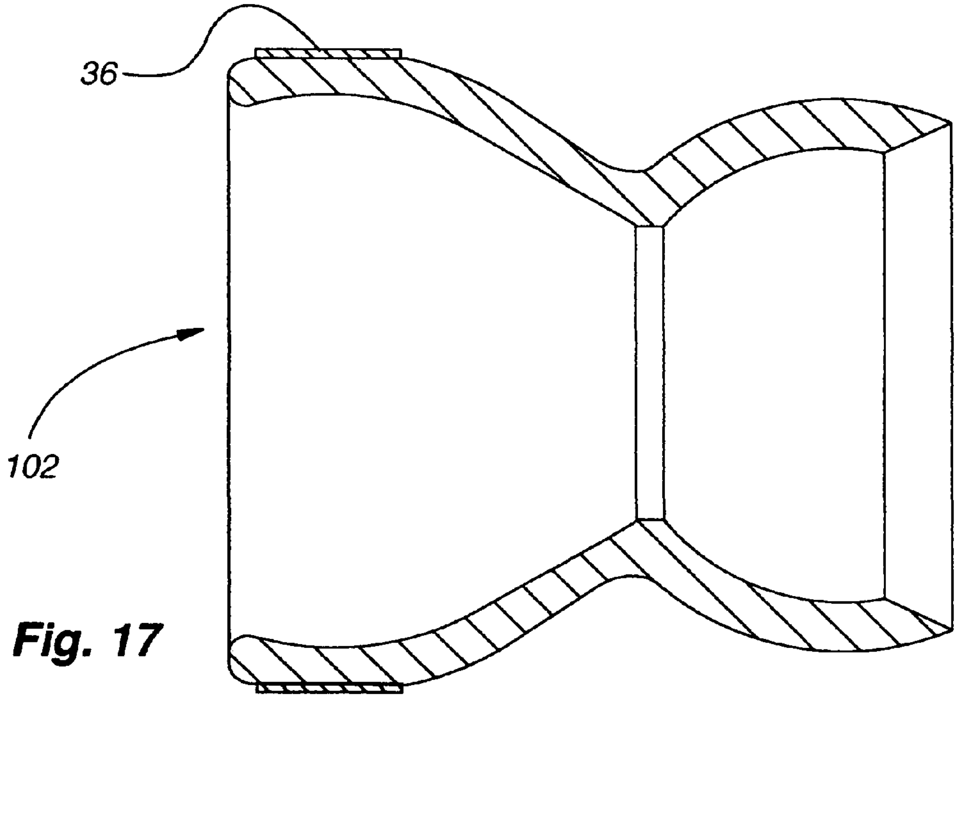
FIG. 17 depicts a cross-sectional view of a connector, showing an integrally-formed fitting, in accordance with an eighth embodiment of the invention.

In addition to the press-fit fittings 30 and clamp fittings 40 described herein, a connector fitting 34 may be integrally formed with a connector body 100, as shown in FIG. 16. Generally, the fitting 34 may be insert-molded or co-extruded with the connector body 100, resulting in a buildup of plastic or polymer at the point where the fitting 34 would ordinarily be located. This integrally-formed fitting 34 may be made of the same material as the connector body 100. Alternately, as shown in FIG. 17, an alternate integrally-formed fitting 36 may be made from a different polymer than a connector body 102. In FIG. 17, the two different materials are indicated by two different shadings: diagonal for the fitting 36 material, and vertical for the body 102 material. Additionally, it should be noted that the fitting 36 material may extend into a recess (not shown) formed on the connector body 102 to facilitate a stronger bond between the two materials, instead of being formed flush on the connector body 102 surface.

In either case, the integrally-formed fitting 34, 36 may be injection-molded to the connector body 100, 102 in the same mold, or in a different one. Further, once the fitting 34, 36 is formed on the body 100, 102, the connector may be removed from the molding apparatus while the connector body 100, 102 is still at least somewhat pliable. For example, the connector may be removed while the body 100, 102 is still warm and pliable (but not necessarily deformable). The male end of the pliable connector may then be inserted into the female end of another, cooled, non-pliable connector, since the male end will deform slightly during insertion. After the male end is inserted, it may return to its original shape and cool. As the connector cools, the connector body 100, 102 will set and gradually lose its pliability, ensuring the male end will not deform as readily during use as when inserted. This, in turn, may permit assembly of a flexible arm from a series of beads 100, 102 having insert-molded fittings.

As shown in both FIGS. 16 and 17, since the fitting 34, 36 is insert-molded or otherwise formed with or on the connector body 100, 102, no retainer, ramp, or other exterior protrusion is necessary to maintain the placement of the fitting 34, 36.

7. Conclusion

As will be recognized by those skilled in the art from the foregoing description, numerous variations on the described embodiments may be made without departing from the spirit and scope of the invention. For example, additional materials may be used to manufacture the connector body and/or fitting. As a further example, the fitting may be tightened along the outer wall of the socket by a threaded screw, instead of being press-fitted or clamped thereon. Further, while the present invention has been described in the context of specific embodiments, such descriptions are by way of example and not limitation. Accordingly, the proper scope of the present invention is specified by the following claims and not by the preceding examples.

We claim:

1. A connector, comprising:

a female end defining an interior socket cavity and open socket external end, the interior socket cavity in communication with the connector exterior via the socket external end;

a male end defining an interior ball cavity and open ball external end, the interior ball cavity in communication with the connector exterior via the ball external end;

a neck joining the male and female ends;

an exterior retention element placed about an exterior of the female end and comprising a clamp fitting configured to limit expansion of the female end;

the exterior of the female end comprising a seat point; and the seat point comprising a flat cylindrical portion adapted to receive the clamp fitting.

2. The connector of claim 1, the neck defining a neck hollow linking the interior socket cavity and interior ball cavity to define a passage.

3. The connector of claim 2, further comprising an inner wall formed within the passage, the inner wall configured to isolate the interior socket cavity from the interior ball cavity.

4. The connector of claim 1, the interior socket cavity comprising a smooth, continuously narrowing passage from the midpoint of the female end to the neck hollow along a longitudinal axis of the connector.

5. The connector of claim 1, the seat point further comprising a linearly tapered surface extending inwardly from the open socket exterior end.

6. The connector of claim 1, the seat point further comprising a linearly tapered surface extending inwardly towards the open socket exterior end.

7. The connector of claim 1, further comprising a cutout, the cutout comprising a recess formed on the connector exterior, the cutout configured to accept a tool for placing the fitting about the exterior of the female end.

8. The connector of claim 1, the interior socket cavity comprising an inner diameter, the male end of a second connector comprising an outer diameter, the inner diameter of the interior socket cavity being smaller than the outer diameter of the male end of the second connector;

whereby insertion of the male end of the second connector into the interior socket cavity results in a friction fit.

9. The connector of claim 1, wherein the widest portion of an exterior of the male end is located midway between the neck and the open ball external end.

10. The connector of claim 1, wherein the widest portion of the exterior of the female end is located towards the neck from the open socket external end.

11. The connector of claim 1, wherein the widest portion of the exterior of the female end is located midway between the neck and the open socket external end.

12. The connector of claim 1, the open socket external end comprising a diameter smaller than the widest portion of the male end.

13. The connector of claim 1, wherein the connector is at least partially formed from plastic.

14. The connector of claim 1, wherein the connector is at least partially formed from metal.

15. The connector of claim 1, wherein the connector is at least partially formed from a ceramic.

16. The connector of claim 1, wherein the connector is at least partially formed from wood.

17. The connector of claim 1, wherein the connector is at least partially formed from a composite material.

18. The connector of claim 1, wherein the fitting is manufactured from plastic.

19. The connector of claim 1, wherein the fitting is manufactured from metal.

20. The connector of claim 1, the fitting further comprising an inner diameter, the female end comprising an exterior diameter, the inner diameter of the fitting being smaller than the exterior diameter of the female end.

21. The connector of claim 1, the fitting further comprising a press-fit fitting.

22. The connector of claim 21, the press-fit fitting comprising an inner diameter smaller than a diameter of the exterior of the female end.

23. The connector of claim 21, wherein the press-fit fitting is manufactured from an elastic material.

24. The connector of claim 1, the clamp fitting comprising a protrusion formed by crimping the clamp fitting onto the exterior of the female end.

25. The connector of claim 1, the clamp fitting comprising a hose clamp.

26. The connector of claim 1, the fitting further comprising an integrally-formed fitting located about the exterior of the female end.

27. The connector of claim 26, wherein the integrally-formed fitting is co-extruded with the exterior of the female end.

28. The connector of claim 26, the integrally-formed fitting comprising the same material as the exterior of the female end.

29. The connector of claim 26, the integrally-formed fitting comprising a different material than the exterior of the female end.

30. The connector of claim 26, the exterior of the female end comprising a recess, the integrally-formed fitting extending thereinto.

31. A connector, comprising:

a female end defining an interior socket cavity and open socket external end, the interior socket cavity in communication with the connector exterior via the socket external end;

a male end defining an interior ball cavity and open ball external end, the interior ball cavity in communication with the connector exterior via the ball external end;

a neck joining the male and female ends;

an exterior retention element placed about an exterior of the female end, the exterior retention element comprising a retainer extending outwardly from the exterior of the female end, the retainer configured to retain a fitting;

the exterior of the female end comprising a seat point; and the seat point comprising a flat cylindrical portion adapted to receive the fitting.

32. A connector, comprising:

a female end defining an interior socket cavity and open socket external end, the interior socket cavity in communication with the connector exterior via the socket external end;

a male end defining an interior ball cavity and open ball external end, the interior ball cavity in communication with the connector exterior via the ball external end;

a neck joining the male and female ends;

an exterior retention element placed about an exterior of the female end, the exterior retention element comprising a ramp extending outwardly from the exterior of the female end, the ramp sloping downward toward the neck;

the exterior of the female end comprising a seat point; and the seat point comprising a flat cylindrical portion adapted to receive a fitting.

33. The connector of claim 32, further comprising a ledge at the end of the ramp nearest the open socket external end.

34. A connector, comprising:

a female end defining an interior socket cavity and open socket external end, the interior socket cavity in communication with the connector exterior via the socket external end;

a male end defining an interior ball cavity and open ball external end, the interior ball cavity in communication with the connector exterior via the ball external end;

a neck joining the male and female ends; and an exterior retention element placed about an exterior of the female end and comprising an integrally-formed fitting located about the exterior of the female end and configured to limit expansion of the female end, wherein the integrally-formed fitting is insert-molded with the exterior of the female end.

35. A flexible connector assembly, comprising:

a first connector comprising:

a female end defining an interior socket cavity and open socket external end, the interior socket cavity in communication with the connector exterior via the socket external end;

a male end defining an interior ball cavity and open ball external end, the interior ball cavity in communication with the connector exterior via the ball external end;

a neck joining the male and female ends;

a second connector comprising:

a female end defining an interior socket cavity and open socket external end, the interior socket cavity in communication with the connector exterior via the socket external end;

a male end defining an interior ball cavity and open ball external end, the interior ball cavity in communication with the connector exterior via the ball external end;

a neck joining the male and female ends;

the male end of the second connector located within the female end of the first connector, the first and second connectors thereby forming an arm;

a clamp fitting located about an exterior of the female end of the first connector, the clamp fitting substantially limiting expansion of the female end of the first connector;

the exterior end of the female end of the first connector comprising a seat point; and the seat point comprising a flat cylindrical portion adapted to receive the clamp fitting.

36. The flexible connector assembly of claim 35, the neck of the first and second connectors each defining a neck hollow, the neck hollow linking the interior socket cavity and the interior ball cavity, whereby the first and second connectors define a continuous passage therethrough.

37. The flexible connector assembly of claim 36, wherein the continuous passage permits transmission of fluids, solids, and gases the length of the connector assembly.

38. The flexible connector assembly of claim 35, further comprising:

a third connector comprising:

a female end defining an interior socket cavity and open socket external end, the interior socket cavity in communication with the connector exterior via the socket external end;

a male end defining an interior ball cavity and open ball external end, the interior ball cavity in communication with the connector exterior via the ball external end;

a neck joining the male and female ends;

the male end of the third connector located within the female end of the second connector, the first, second and third connectors thereby forming an arm;

a second fitting located about an exterior of the female end of the second connector, the fitting limiting expansion of the female end of the second connector; and a level of frictional resistance between the female end of the second connector and the male end of the third connector being different than a level of frictional resistance between the female end of the first connector and the male end of the second connector.

39. A method for assembling a flexible connector assembly, comprising:

providing a plurality of connector bodies, each connector body comprising:

a female end defining an interior socket cavity and open socket external end, the interior socket cavity in communication with the connector body exterior via the socket external end and an exterior of the female end comprising a seat point;

the seat point comprising a flat cylindrical portion adapted to receive a clamp fitting;

a male end defining an interior ball cavity and open ball external end, the interior ball cavity in communication with the connector body exterior via the ball external end;

a neck joining the male and female ends;

inserting the male end of a first of the connectors through the open socket external end and into the internal socket cavity of a second of the connectors; and placing the clamp fitting about the female end of the second of the connectors.

40. The method of claim 39, wherein the clamp fitting limits expansion of the female end of the second of the connectors.

41. The method of claim 39, wherein the clamp fitting prevents the male end of the first of the connectors from decoupling from the female end of the second of the connectors.

* * * * *